United States Patent [19]
Pascouet

[11] Patent Number: 4,921,068
[45] Date of Patent: * May 1, 1990

[54] INTERNAL BUBBLE-SUPPRESSION METHOD AND APPARATUS

[76] Inventor: Adrien P. Pascouet, 12014 Chatam La., Houston, Tex. 77024

[*] Notice: The portion of the term of this patent subsequent to Apr. 5, 2007 has been disclaimed.

[21] Appl. No.: 162,743

[22] Filed: Mar. 1, 1988

Related U.S. Application Data

[63] Continuation-in-part of Ser. No. 703,302, Feb. 20, 1985, abandoned.

[51] Int. Cl.$^5$ .............................................. G01V 1/04
[52] U.S. Cl. .................................. 181/115; 181/120; 367/144
[58] Field of Search ............... 181/115, 118, 120, 402; 367/144, 146

[56] References Cited

U.S. PATENT DOCUMENTS

| | | | |
|---|---|---|---|
| 3,601,216 | 8/1971 | Mott-Smith | 181/115 |
| 3,923,122 | 12/1975 | Itria | 181/115 |
| 4,382,486 | 5/1983 | Ruehle | 181/118 |
| 4,577,723 | 3/1986 | Savit | 181/120 |
| 4,727,956 | 3/1988 | Huizer | 181/115 X |
| 4,735,281 | 4/1988 | Pascouet | 181/115 |

Primary Examiner—Brian S. Steinberger
Attorney, Agent, or Firm—Arnold, White & Durkee

[57] ABSTRACT

The present invention comprises an apparatus and method for producing a high resolution acoustic signal from a single point source while achieving a commercially acceptable secondary bubble suppression. More specifically, the present invention comprises first and second explosive generators which sequentially create two explosions or one explosion and injection, within the body of water; said first explosion producing within the body of water a powerful acoustic pulse in an expanding cavity of very low pressure, said second explosion or injection establishing hydrostatic pressure within the cavity about the same time the volume of the cavity reaches its maximum volume, thereby substantially reducing the secondary pressure pulses.

33 Claims, 12 Drawing Sheets

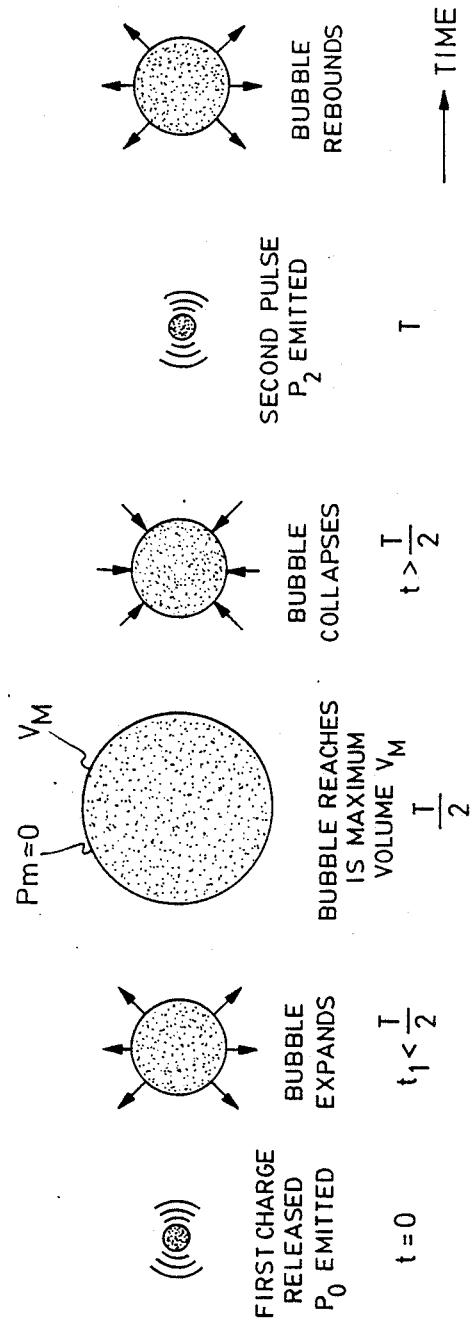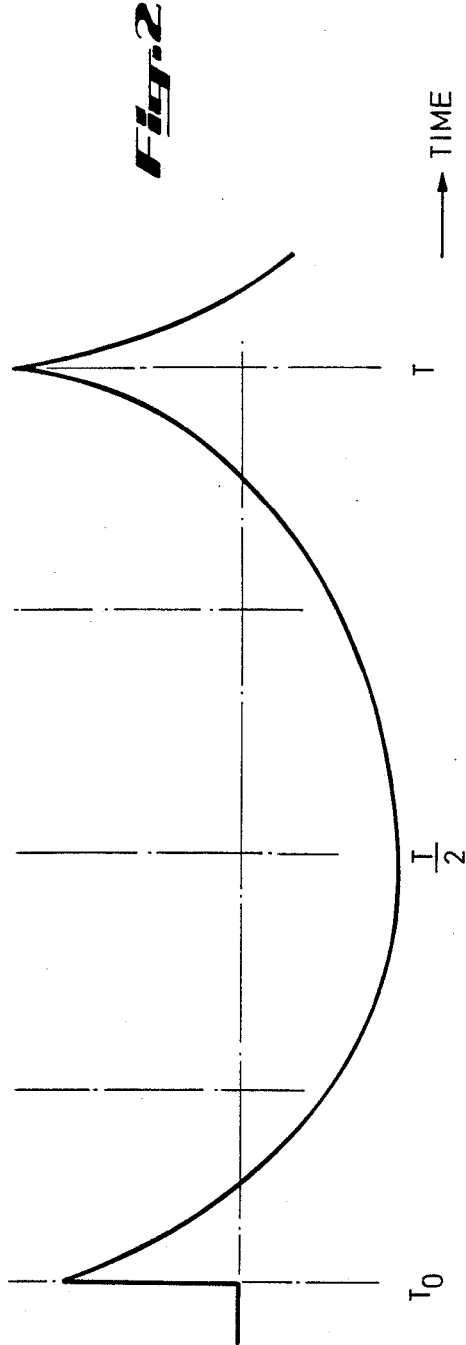

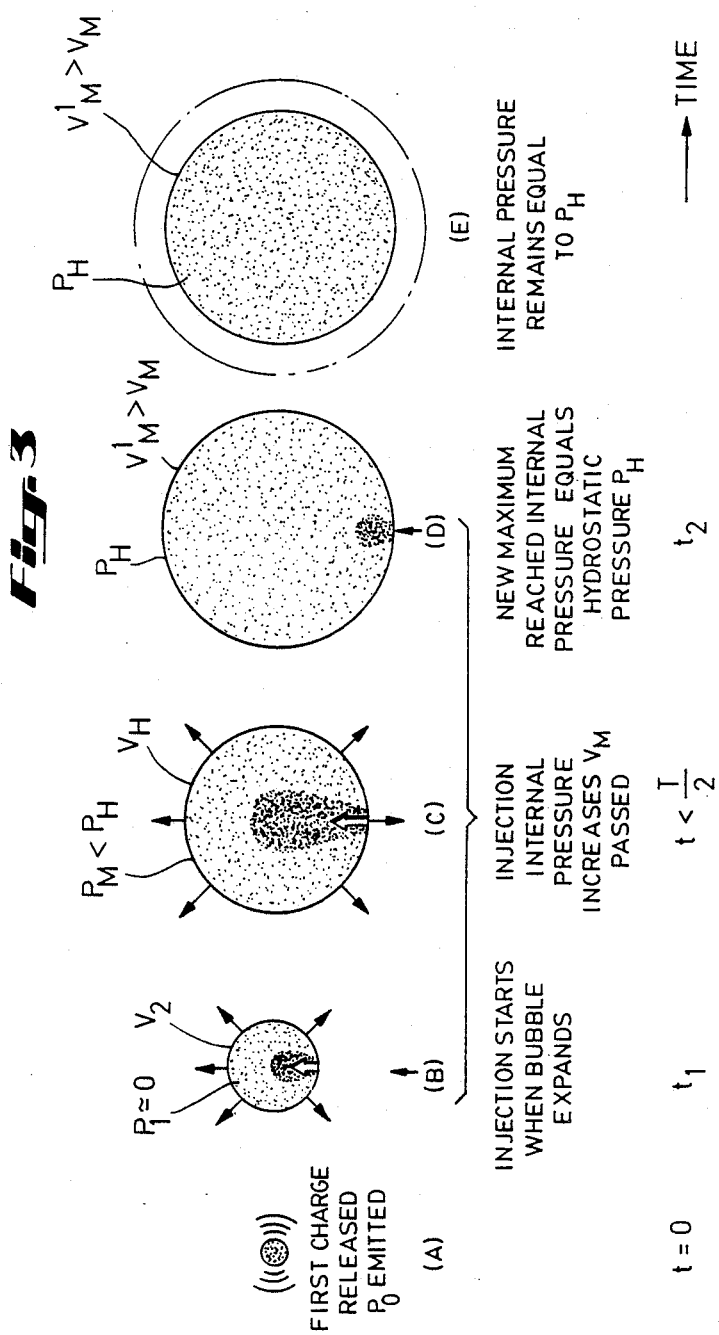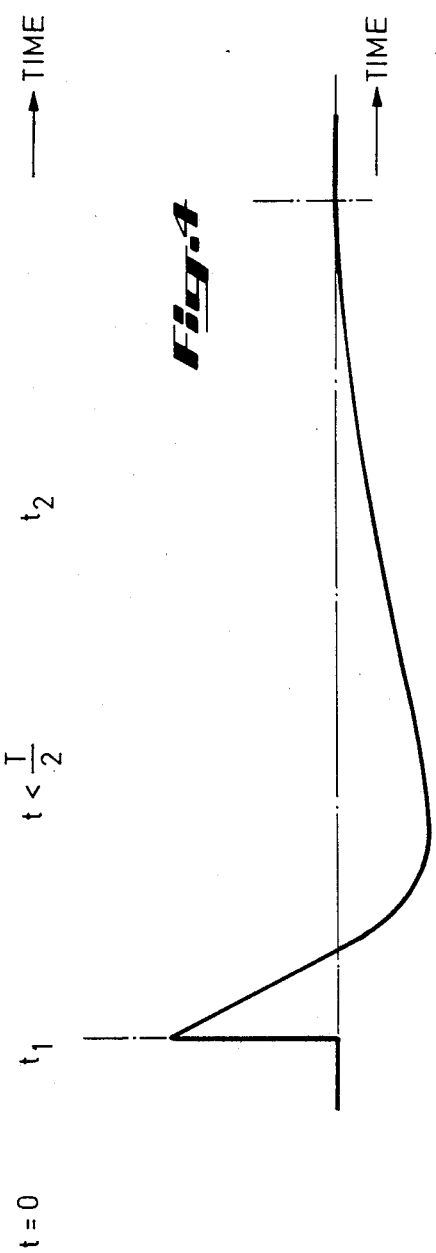

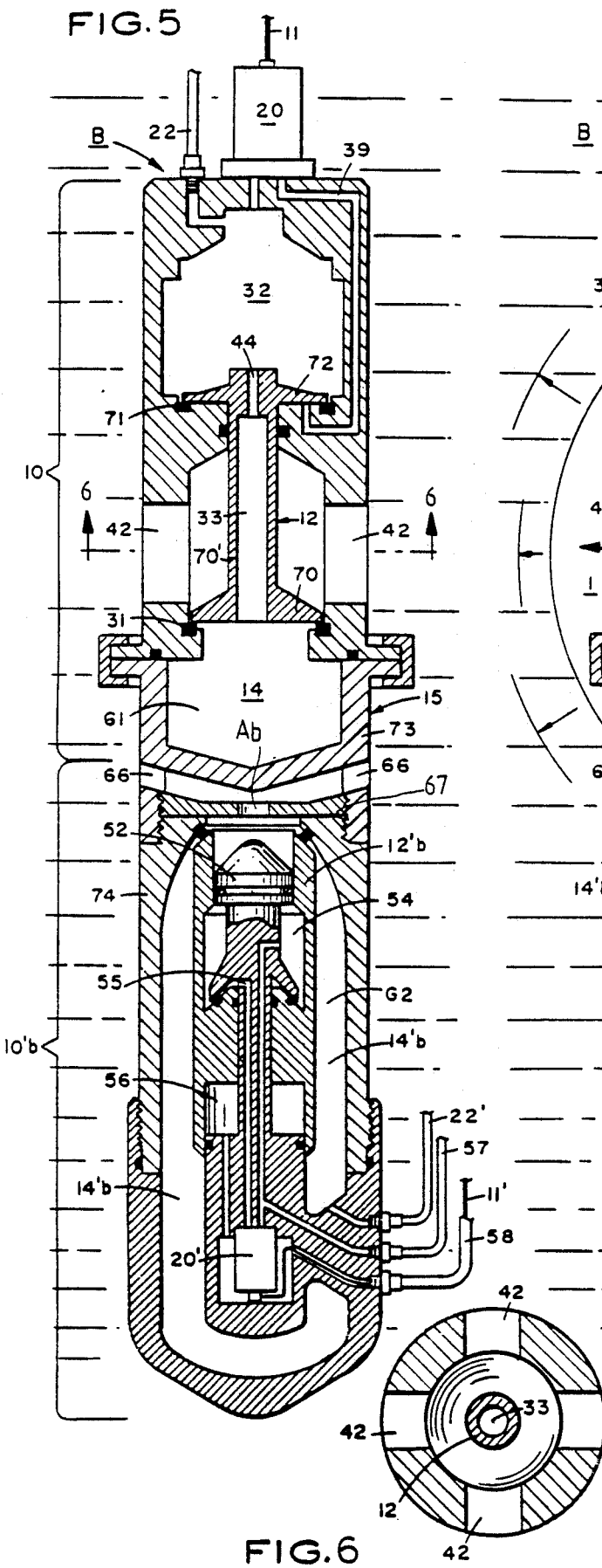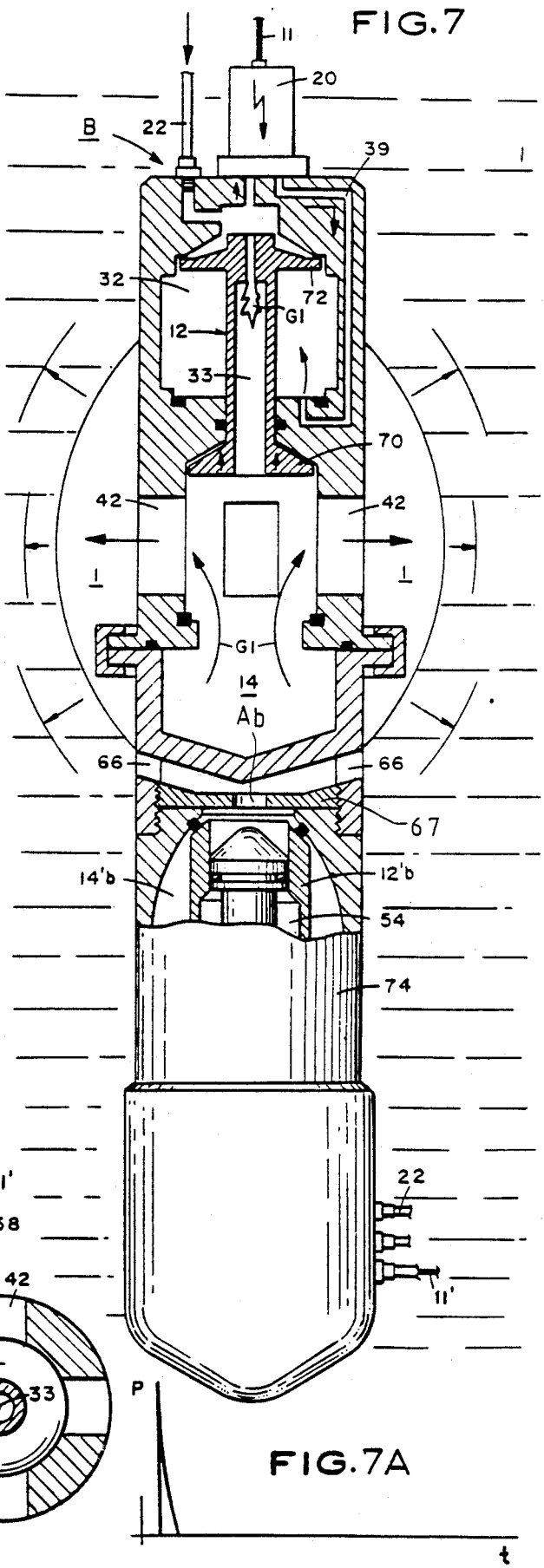
FIG.5 FIG.7
FIG.6 FIG.7A

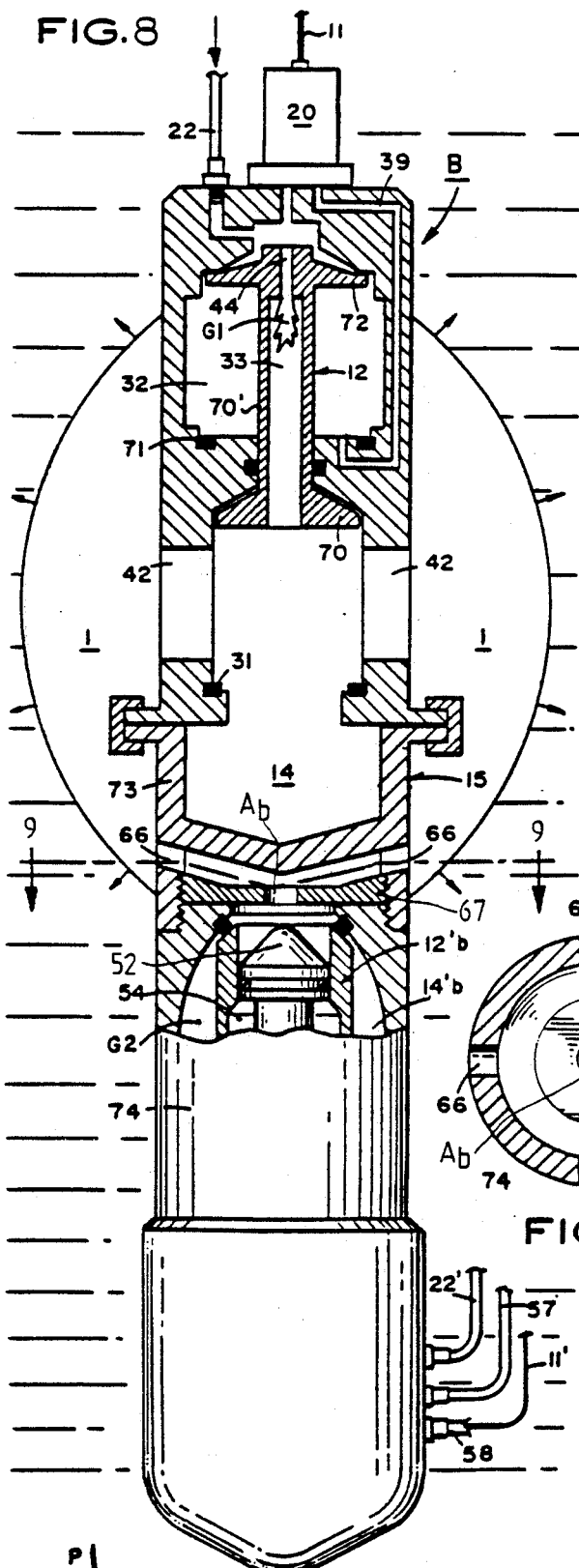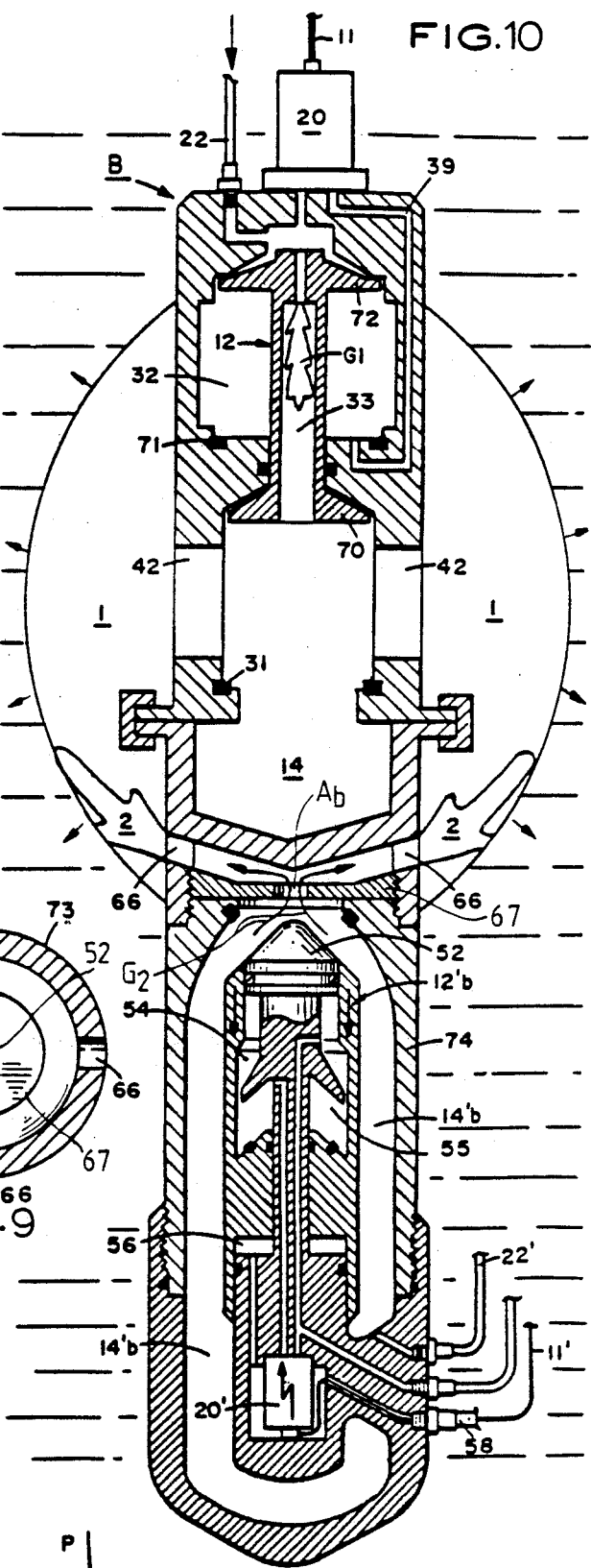

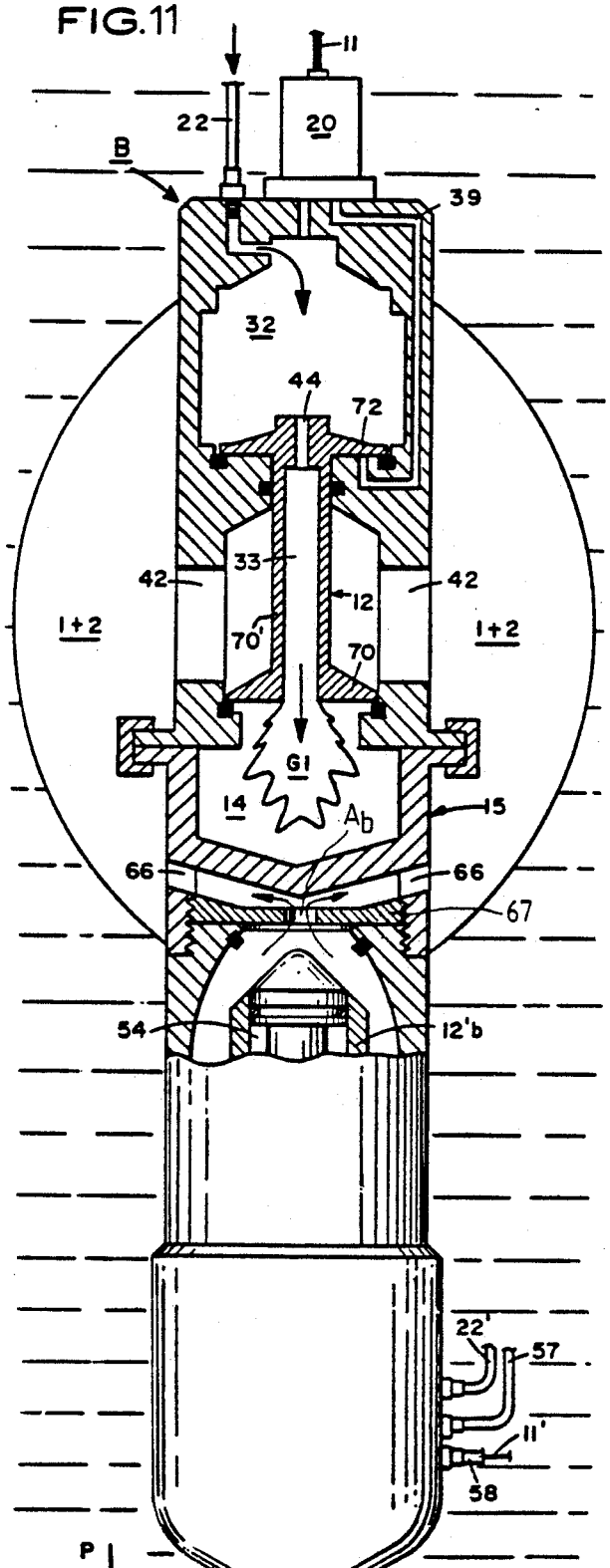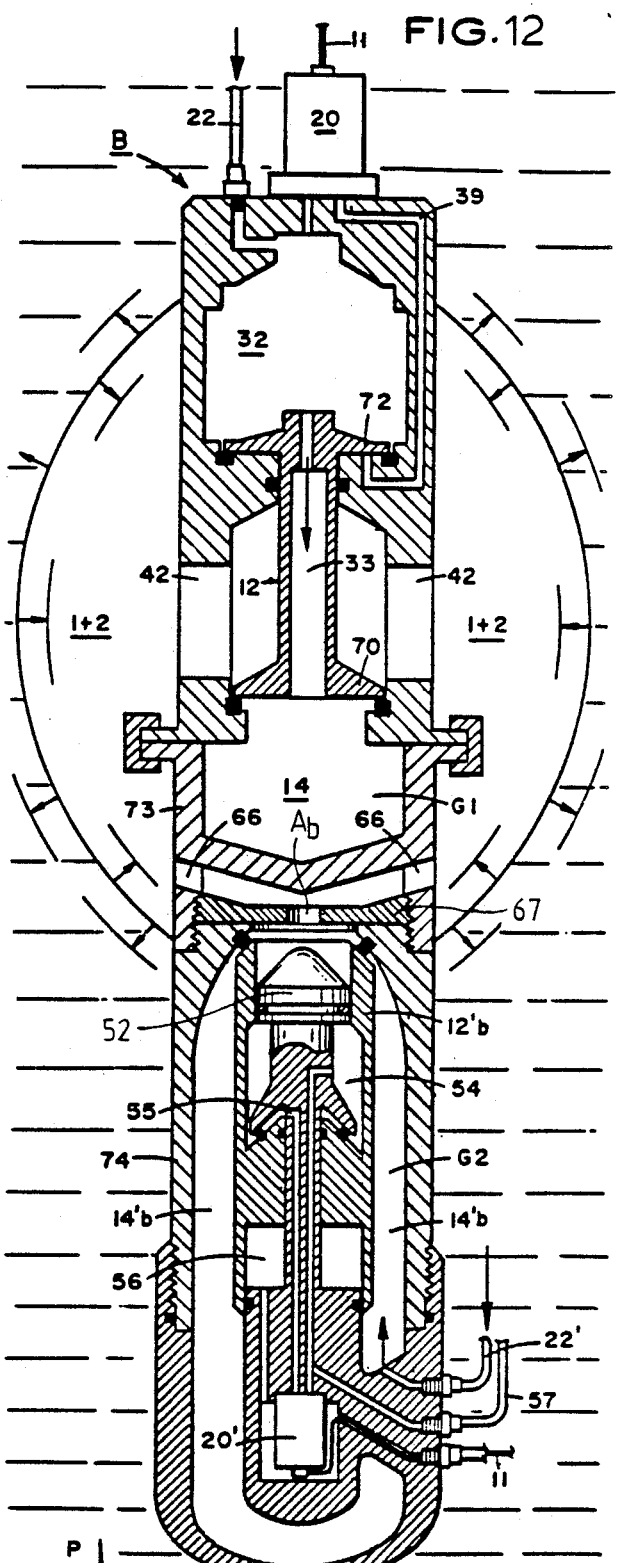

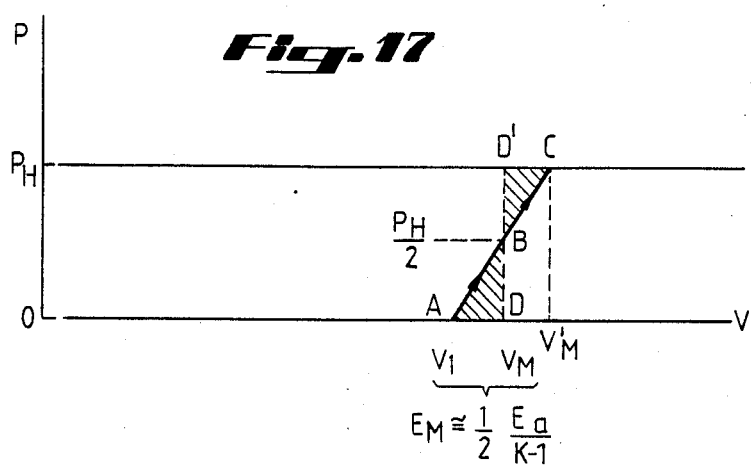
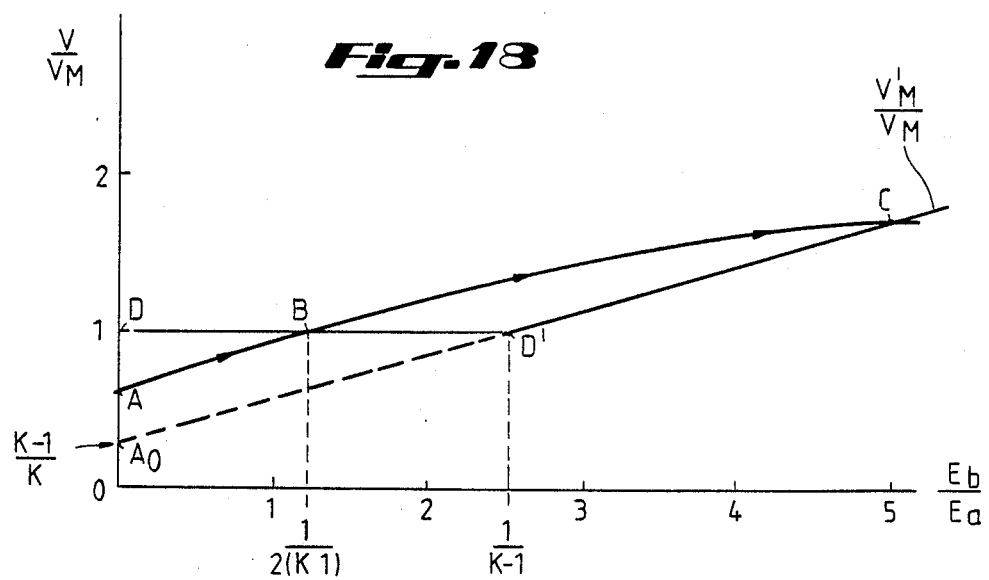

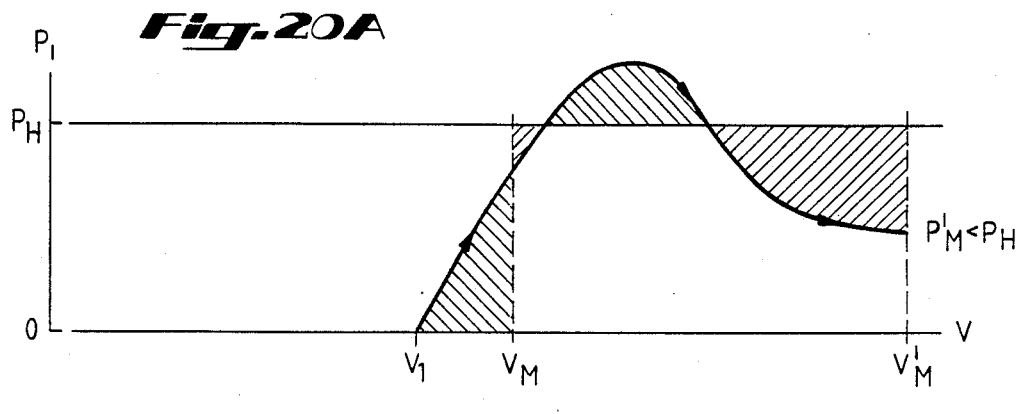
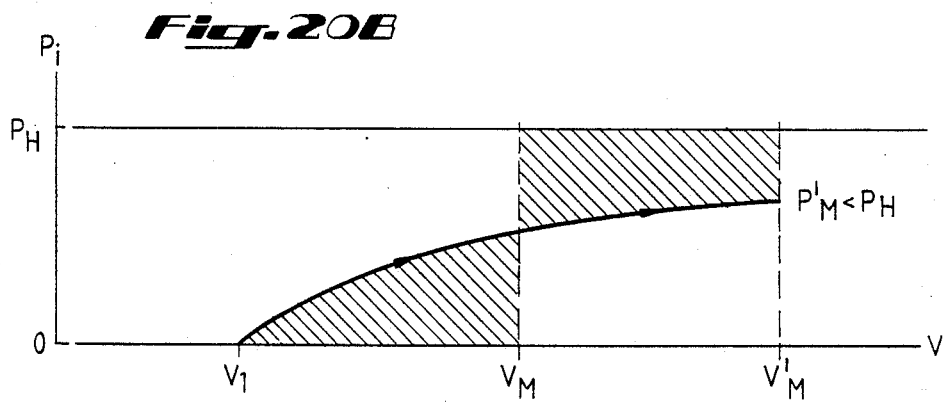
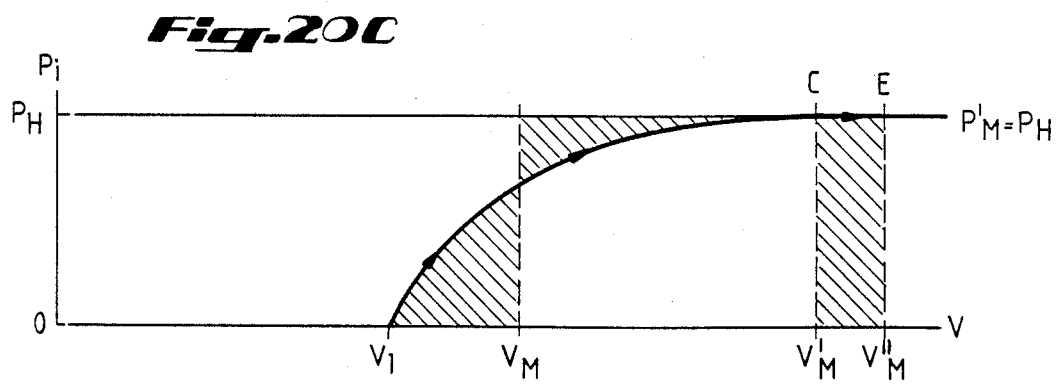

INTERNAL BUBBLE-SUPPRESSION METHOD AND APPARATUS

CROSS REFERENCE TO RELATED APPLICATIONS

This application is a continuation-in-part of Applicant's co-pending application Ser. No. 703,302, now allowed as U.S. Pat. No. 4,735,281. The disclosure of the parent application, filed 2/20/85, is hereby incorporated by reference.

BACKGROUND OF THE INVENTION

1. Field of the Invention

This invention generally relates to methods and apparatus which employ high energy gas bubbles to generate underwater, sharp, impulsive acoustic signals especially useful in marine seismic exploration. The invention relates more particularly to improve such methods and apparatus wherein secondary acoustic pulses or signals are suppressed.

2. Description of the Prior Art

Certain seismic sources such as explosives, air guns, gas exploders, etc., are purposely fired deep under water. It is well known that such firing creates a gas bubble or cavity and that the water acquires oscillatory energy which generates acoustic pressure wavelets, each consisting of a desired "primary" acoustic pressure pulse having an amplitude $P_o$, which is especially useful for most seismic exploration work, and which is followed by an oscillating succession of undesired "secondary" (sometimes called "bubble") acoustic pulses of decreasing amplitude. In this specification, the words "bubble" and "cavity" will be used interchangeably.

For example, an air gun explosively releases a high pressure gas bubble having an energy $E_a$ into the water which creates a desired primary pressure pulse having a maximum amplitude $P_o$. After the released high-pressure gas bubble impulsively contacts the surrounding water, it continues to expand as the water first accelerates outwardly and later decelerates until the cavity attains a maximum volume and comes to rest, at which time the pressure within the cavity is much less than the surrounding hydrostatic pressure. At this point, the cavity has attained a maximum volume $V_m$.

When the expanding bubble reaches its maximum volume, there is practically a vacuum inside the bubble, the kinetic energy of the surrounding water is zero, and this water possesses maximum oscillatory potential energy which, if not suppressed, will change into kinetic energy, back into potential energy, etc., for a duration of several cycles, each having an oscillatory time period T.

The water gains maximum potential energy at $\frac{1}{2}$ T, at which time the water is ready to change course and rush inwardly to implode the gas in the bubble. After one complete cycle, i.e., at time T, the bubble is recompressed into a relatively small-diameter, high-pressure bubble. The surrounding water comes to an abrupt stop resulting in a first positive acoustic secondary pulse having an amplitude $P_2$ which is mainly dependent upon the maximum kinetic energy acquired by the inwardly-moving water. The less kinetic energy acquired by the water, the smaller the amplitude $P_2$ will be.

Thus, the secondary pulse phenomenon occurs when the surrounding water first violently implodes the bubble to a minimum diameter or volume, the kinetic energy is again zero and the potential energy is mainly contained within the recompressed gas inside the bubble. This potential energy causes the bubble to again explode in its oscillatory scheme as previously described.

In this manner, the oscillatory energy stored in the water produces several successive secondary pulses of decreasing amplitude until a portion of the energy of oscillation becomes dissipated by natural processes, such as turbulence, and the remaining portion is consumed to produce the undesired secondary pulses.

The number of such bubble explosions (expansions) and implosions (contractions) may vary, but typically four to six significant secondary pulses can be expected after each primary pulse $P_o$ which is generated by the seismic source. Hence, a substantial portion of the acoustic energy released by the seismic source goes to waste because only a portion of the energy contained in the released gas is used to produce the desired primary seismic pulse $P_o$, while the remaining and substantial portion of the energy becomes converted into harmful secondary seismic pulses having amplitudes $P_2$ which must be suppressed.

In seismic exploration, both the primary and secondary acoustic pulses act as distinct acoustic disturbances which travel in the water in all directions, penetrate the earth, strike one or more rock formations or reflectors, and then return into the body of water. The primary and secondary pulses produce reflected seismic wavelets. But, since the secondary pulses and their reflected waves occur at times when the reflected primary waves also return from the subterranean reflectors, the secondary pulses and their reflected wavelets interfere with the reflected primary waves. Further, because the reflected secondary waves and the reflected primary waves are similar in shape, no practical way has yet been found for distinguishing between them.

In conducting marine seismic surveys, the reflected primary and secondary seismic waves are sensed by detectors within a towed streamer cable. The detectors faithfully transform the received acoustic seismic waves into corresponding electric signals which are processed into seismic traces that contain appreciable noise. This noise is due mostly to the oscillatory secondary pulses which accompany each primary pulse. Under these noisy conditions, computations of the depths at which the rock formations lie become very difficult and sometimes altogether impossible. This noise hinders the main object of the seismic exploration, which is, of course, to identify the various subterranean formations from an interpretation of the seismogram sections produced by the seismic survey.

The secondary-to-primary ratio amplitude $P_2/P_o$ is the benchmark by which all marine seismic sources are measured as to bubble suppression. An "ideal" source is said to be that source which has a ratio $P_2/P_o=0$ for a frequency range from 0-125 Hz. Therefore, the extent to which a particular seismic source approaches the ideal seismic source can be readily measured by measuring its $P_2/P_o$ ratio.

An ideal seismic source produces a single, short, sharp acoustic impulse having sufficient energy and no secondary pulses. Sharp impulses are needed to improve the definition of seismic reflections, because resolution is inversely proportional to the time-width of the impulse: the larger the time-width of the impulse, the less desirable it is. Fired near the water surface, a dynamite charge or other similar concentrated explosion closely approximates the ideal seismic source, because the bubbles resulting from each explosion are vented immediately into the atmosphere, hence there are no bubble implosions. If not fired near the water surface, explosive seismic sources will produce undesired secondary pulses, unless some form of implosion suppression is utilized. Explosive seismic sources include explosives, air guns, gasguns, expandable sleeve devices in which propane and oxygen are mixed to cause internal combustion, etc. All of these share the common bubble problem for which there has been no fully satisfactory solution, even though there has been a long-felt need to find a mechanism to enhance the desired primary pulse at the expense of the undesired secondary pulses.

In the absence of such a mechanism, many attempts have been made in the past twenty-five years or more by the energy industry and their seismic contractors to develop techniques for reducing the burden, financial and technological, imposed by the generation of the undesirable secondary pulses. These efforts have been directed toward attenuating the oscillatory secondary pulses and/or to reduce their ill effects. From the initial introduction of marine seismic sources, there has been a continuous need for effective and economical bubble suppression devices. That need and the various solutions offered to fill that need are well described in the technical and patent literature.

One early mechanical technique attempt to prevent the secondary pulses from traveling vertically downward towards the water bottom involved a method whereby the gas bubble source was substantially enveloped in a container or cage having perforations, such that the expanding gas bubble would have to do work in order to force water through the perforations. The work performed by the expanding gas bubble dissipated its internal energy, so that the ensuing secondary pulses would have reduced amplitudes. This technique has been used in a seismic source trademarked FLEXOTIR. A serious limitation inherent in this technique has been that the desired primary pulses also become reduced in strength because they can travel freely only through the available perforations. Also, the perforated cage becomes subjected to rapid deterioration, due to the great stresses to which it becomes subjected when large differential pressures become exerted across its wall.

Various software programs have also been developed, for example, in connection with the MAXIPULSE (trademark) seismic source, which utilize fast and powerful digital computer which produce seismograms from which the detected noisy seismic waves, caused by the deleterious bubble effects, have been removed so that the seismograms can be easier interpreted by the geophysicists. However, running such programs requires the use of expensive computer time and manpower, see e.g., U.S. Pat. No. 3,592,286.

Other prior art techniques have been based on air being injected into the expanding bubble for shaping the secondary pulses. The known applications of the air injection technique have led prior art workers to very disappointing results and most of them were abandoned.

Due to the inefficiency or impracticability of known bubble suppression techniques, the seismic industry has also been obliged to employ a "tuned" array of seismic sources. Typically, these sources are air guns of markedly different sizes. In theory when all such seismic sources are situated in a tuned array, and then fired simultaneously, the amplitude of the resulting primary pulse of the array will be equal to the sum of the amplitudes of the individual primary pulses generated by the individual acoustic sources. Conversely, the amplitudes of the secondary pulses will theoretically be reduced because (1) they are not in phase, (2) they occur at different times, and (3) they have random frequencies.

Though the aforedescribed array technique has been the standard in this art, this technique has presented serious drawbacks since the resultant seismic signature is only a composite of individual sources, each source lacking a narrow, sharp acoustic pulse as required. Also it has been very expensive to build such an array because it has required a large number of differently-sized air guns, as well as heavy and expensive air compressors, to provide the appropriate volume of pressurized gas consumed by the large number of airguns. Additionally, there is also a need to maintain on boat a large inventory of spare parts to keep the differently-sized sources operational. The spare part problem is very serious, because in many parts of the world they are not available and they must be flown in from the home base. Many parts break down daily and some weekly due to salt water, pollution, unsuspected debris, high pressure, etc.

SUMMARY OF THE INVENTION

The present invention addresses the above noted and other disadvantages of prior art marine acoustic generators and their methods of use by providing an economical apparatus and method of producing a high resolution acoustic signal from a single point source while achieving at least commercially acceptable, secondary bubble suppression.

The present invention substantially reduces the pressure pulse generated by an implosion of a cavity within a body of water by aborting the implosion. The abortion of the implosion is produced by generating within the cavity an injection before or at the instant this cavity attains its maximum volume $V_m$. This injection must have sufficient energy $E_b$ to establish hydrostatic pressure $P_H$ within this cavity close to the time that the cavity becomes stationary. Preferably, this injection must establish hydrostatic pressure at the time the volume of the cavity first becomes stationary. Expressed otherwise, the present method may be used to generate within a body of water an impulsive acoustic signal by generating a first explosion within the body of water to produce therein a powerful pressure pulse and a cavity of very low pressure, and then generating an injection of gas within the cavity, so as to establish hydrostatic pressure $P_H$ inside the cavity such that the volume of the cavity becomes stationary about the time the pressure within the cavity equals hydrostatic pressure.

The apparatus of the invention comprises first and second explosive generators which sequentially create two explosions or one explosion and an injection, within the body of water: a first explosion which produces within the body of water a powerful acoustic pulse and an expanding cavity of very low pressure, and a second explosion or injection which establishes hydrostatic pressure within the cavity about the same time the volume of the cavity reaches about its maximum volume, thereby substantially reducing the ensuing secondary pressure pulses.

The present invention has a number of advantages over the prior art. First, the apparatus and method of the present invention enables complete or at least commercially feasible secondary pulse suppression while utilizing a single point source.

Yet another advantage of the present invention is the ease and economy with which secondary pulses may be "tuned out" of the acoustic signature by the modification of a variety of operational parameters.

BRIEF DESCRIPTION OF THE DRAWINGS

FIG. 1 illustrates an oscillating bubble in a body of water;

FIG. 2 is a pressure vs. time signature of FIG. 1;

FIG. 3 illustrates the behavior of bubble 1 when acted upon by bubble 2 in accordance with the invention;

FIG. 4 is a pressure vs. time signature corresponding to FIG. 3;

FIGS. 5, 7, 8, 10-12 are sectional views of the present invention, showing six operating phases thereof;

FIG. 6 is a sectional view taken on line 6—6 of FIG. 5;

FIG. 9 is a sectional view taken on line 9—9 of FIG. 8.

FIGS. 7A, 8A, 10A-12A are pressure signatures obtained with the embodiment shown in FIGS. 7, 8, and 10-12 respectively;

FIG. 17 graphically represents the conditions for total bubble suppression when the injected energy $E_b$ is slightly larger than $E_a/k-1$.

FIG. 18 graphically represents the variations of the new maximum volume $V'_m$ versus the injected energy for a total bubble suppression, and the possible paths followed by an ideal injection.

FIG. 20 graphically represents three types of injections with different ratios $t_1/T$ and $\Delta t/T$.

DESCRIPTION OF THE PREFERRED EMBODIMENT

1. Generally

Figure 13:
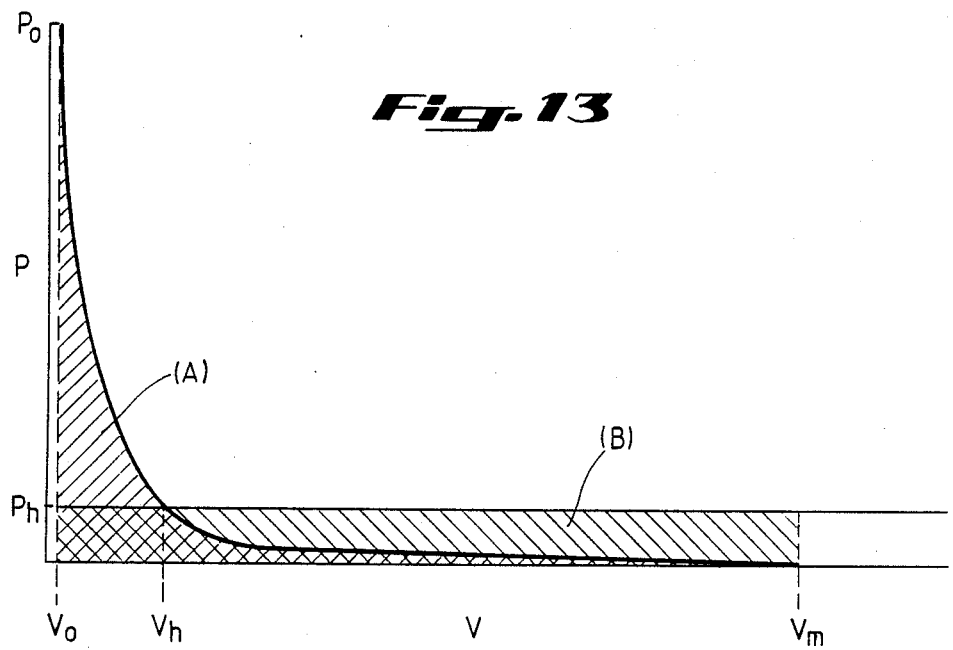
FIG. 13 is a graphical representation illustrating the conservation of energy for an expanding bubble without any injection of gas.

A general theory upon which the method and apparatus of the present invention is based is that generally descriptive and applicable to the law of thermodynamics and fluid dynamics. More particularly and as may be seen in the accompanying illustrations, the present invention relates to the periodic, underwater release of a compressed gas such as to form a series of sharp acoustic signals.

When a charge of highly pressurized gas having a pressure $P_a$ is explosively released at a sufficient depth within a body of water having a hydrostatic pressure $P_H$, a bubble is created such as to define a primary pulse having a maximum amplitude $P_o$. See FIG. 1 and 2. At the instant the gas is released, the internal pressure $P_i$ is quite large compared to the surrounding hydrostatic pressure $P_H$, and therefore the bubble will radially expand, setting the water into an outward motion. At the instant the gas is released, this internal pressure $P_i$ is a maximum, hence $P_i = P_a$.

During this radial expansion, the internal pressure of the bubble $P_i$ decreases until it renders an equilibrium value $P_H$ and the water acquires kinetic energy. However, this kinetic energy stored in the water allows the bubble to expand beyond its equilibrium state—for which the internal pressure $P_i = P_H$, and thus the bubble continues to expand up to a maximum volumetric value $V_m$.

When the bubble establishes this maximum volume $V_m$ at time $T/2$ after its initial release, its internal pressure $P_i$ has fallen well below hydrostatic pressure $P_H$, and a near vacuum is established in the bubble. At such an instant, the kinetic energy of the surrounding water is zero, but the potential energy of the water is at a maximum. The bubble now begins to contract.

Because the hydrostatic pressure $P_H$ is now larger than the internal pressure $P_i$ of the bubble, the aforedescribed process begins to reverse. Now, the bubble begins to contract with a corresponding increase in internal pressure. Upon this collapse, the surrounding water acquires kinetic energy. When the bubble passes its static equilibrium state, i.e., when the internal pressure $P_i$ of the bubble is equal to the hydrostatic pressure $P_H$ of the water, the kinetic energy stored in the water is at a maximum, causing the bubble to collapse further with a corresponding increase in internal pressure $P_i$, to a point substantially above the hydrostatic pressure $P_H$.

At the end of the described cycle at a time T after the initial release of the pressurized gas the bubble is unable to collapse any further, thus abruptly halting the inward rush of the imploding water. This abrupt halt in the collapse of the bubble results in a first acoustic secondary pulse having an amplitude $P_2$ when measured at a distance r from the bubble's center.

At this point at a time T, the bubble is recompressed into a small volume with an internal pressure $P_i$ far in excess of the surrounding hydrostatic pressure $P_H$. As a consequence, the bubble again undergoes a radial expansion—reproducing the process with a period T.

Clearly from the above, the secondary pulse phenomena (as schematically illustrated in FIG. 2) begins when the bubble establishes its maximum volume $V_m$, since it is from this maximum value that the bubble begins to collapse upon itself—or implode—resulting in the undesired, secondary acoustic peak.

The amplitude of this secondary pulse $P_2$, more precisely the product $P_2 \times r$, where r is the distance at which the pressure $P_2$ is measured, is dependent upon:

$P_H$—hydrostatic pressure $P_m$ = internal pressure of the bubble at $V_m$ where $V_m$ is the maximum volume of the bubble If $P_m = P_H$ the bubble will maintain its equilibrium state and no secondary pressure pulse will be emitted, hence $P_2 = 0$. However, the larger the difference between $P_H$ and $P_m$, the greater the secondary pulse $P_2$.

2. Bubble Behavior

During the aforedescribed periodic oscillation of a bubble resultant from a gas charge, two forces act on the water. These forces include the gas pressure of the bubble $P_i$, and the hydrostatic pressure $P_H$. During the expansion phase of the bubble, the gas inside the bubble undergoes an adiabatic expansion.

Figure 14:
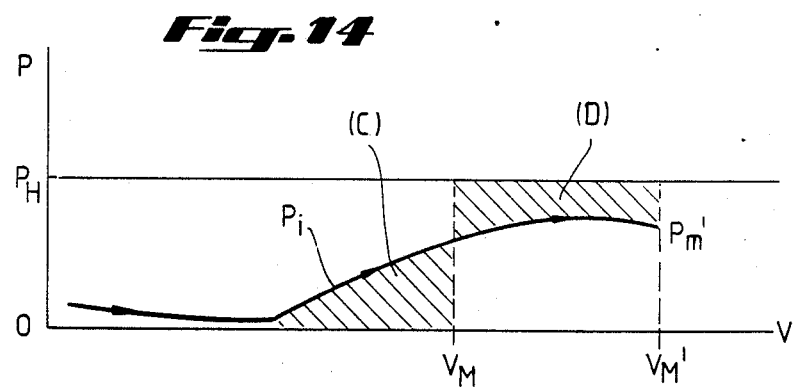
FIG. 14 is a graphical representation illustrating the conservation of energy when an injection of gas is made.

The law of conservation of energy applied to this expansion phase up to the bubble's maximum volume $V_m$, requires that the total work done by the gas be equal to the work done by the hydrostatic pressure $P_H$. (FIG. 13) Thus, any energy spent by an injected gas into the bubble must be compensated by an equal amount of extra work done by this hydrostatic pressure $P_H$, which requires that the bubble's maximum volume be increased proportionally. Restated, any injection of gas into the bubble before it reaches its maximum value $V_m$, will result in a volumetric increase or an increase in $V_m$ to $V'_m$. Therefore, any increase in the internal pressure $P_i$ of the bubble by injecting gas therein before it reaches its original maximum value $V_m$ will require a commensurately larger amount of energy which will have to be spent after $V_m$ and up to $V'_m$. (FIG. 14)

3. Theory of Bubble Suppression

In the ideal case, total bubble suppression results in a strong first primary pulse with no secondary pulses, hence $P_2 = 0$. To achieve $P_2 = 0$, the bubble must reach its state of equilibrium characterized by two conditions:

(a) When the bubble reaches its new maximum volume $V'_m$ characterized by $dv/dt = 0$, or alternatively kinetic energy of the water $E_k = 0$;

(b) then the internal pressure $P_i$ of the bubble must be equal to the ambient hydrostatic pressure $P_H$: $P_i = P_H$ at $V'_m$ It has been found that if the above stated conditions are not satisfied when the injection of the gas ends at a time $t_2$, it is not possible to later satisfy these conditions. Restated, equilibrium must be achieved, if at all, at the end of the injection. If this equilibrium state is not reached, total bubble suppression of the secondary pulse is not possible. Those two conditions (a) and (b) are independent of any particular way the injection is made.

If a first charge of highly pressurized gas having an energy $E_a$ is explosively released in a body of water, and if subsequently a second charge of a highly pressurized gas having an energy $E_b$ is injected into the bubble (cavity) created by the first charge, and if the energy lost by the injected gas during the injection is designated $E_i$, then when the injected bubble reaches it maximum volumetric value $V'_m$ the internal pressure of the bubble is given by:

$$P_m = (k-1)\frac{E_b - E_i}{E_a + E_i}(P_H) \quad (3)$$

where k = the ratio of specific heats of the gas utilized in the injection. For air $k = 1.40$.

Figure 15:
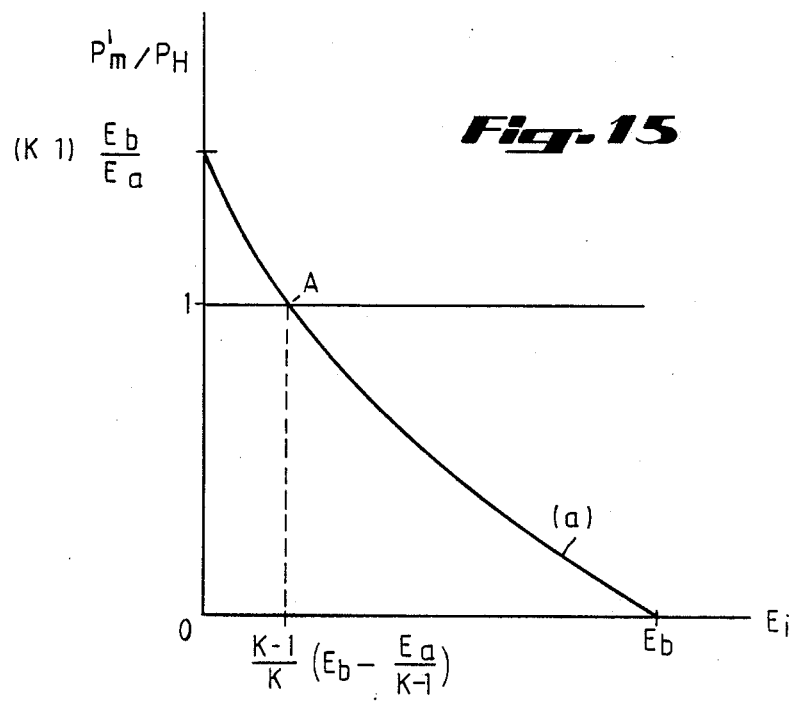
FIG. 15 graphically represents the variation of the dimensionless ratio $P'_m/P_H$.

The variations in the dimensionless ration $P'_m/P_H$ with respect to $E_i$ is represented in FIG. 15. FIG. 15 illustrates that since total bubble suppression (ideal) can only be achieved if $P'_m = P_H$, total suppression can only be achieved when $$(k-1)E_b/E_a \geq 1 \quad (4)$$

or $E_b \geq E_a/k - 1$

Since for air $k = 1.40$, the injected energy $E_b$ must be at least equal to 2.5 $E_a$; hence for total bubble suppression:

$$E_b \geq 2.5 E_a$$

For example, if the same pressure is used in both the first and second gas charge ($P_a = P_b$), the ratio of the above values dictates that $V_b/V_a \geq 2.5$. But FIG. 15 shows further that if $E_b$ is larger than the minimum energy (represented by $E_a/k - 1$), total suppression is possible providing that the injection is made in such a way that the injected gas fully utilizes or loses the energy $E_i$, where $$E_i = \frac{k-1}{k}\left(E_b - \frac{E_a}{k-1}\right); \quad (5)$$

or a given proportion of the excess of the injected energy over the minimum energy. As noted for air, $k = 1.40$. Therefore $k - 1/k = 0.286$ and the energy lost must be equal to 28.6% of the excess of energy.

It has also been found that the maximum volume $V'_m$ of the bubble must be equal to $$V'_m = \frac{k-1}{k}\frac{E_a + E_b}{E_a}V_m \quad (6)$$

in order to achieve total bubble suppression.

Thus the two (2) conditions (a) and (b) above can be expressed by the following relationship between the following parameters:

(c) total bubble suppression is possible only if the injected energy is at least equal to $E_a/k - 1$:

$$E_b \geq \frac{E_a}{k-1}$$

and the total suppression is actually achieved if $$(d) \quad E_i = \frac{k-1}{k}\left(E_b - \frac{E_a}{k-1}\right) \quad (5)$$

and $$(e) \quad V'_m = \frac{k-1}{k}\left(\frac{E_a + E_b}{E_a}\right)V_m \quad (6)$$

In other words, to establish total suppression, any injection of a second charge of a highly pressurized gas into the bubble, where said charge has an energy $E_b$, must be of such character that:

(d) the work done by the injected gas is equal to $k - 1/k$ times the excess of energy $E_b - (E_a/k - 1)$ over the minimum energy;

and (e) the ratio of the new maximum volume to the original maximum volume $V'_m/V_m$ is equal to $k-1/k$ times the ratio of the total energy spent $(E_a+E_b)$ to the original energy that generates the bubble $E_a$.

Figure 16:
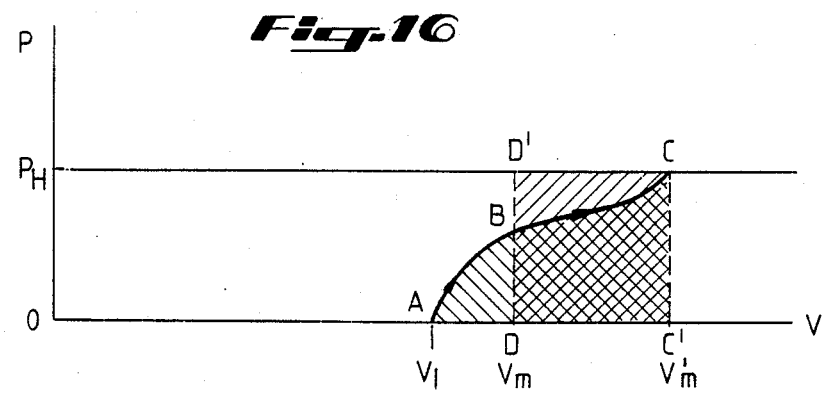
FIG. 16 graphically represents the conditions for total bubble suppression.

FIG. 16 illustrates how these two basic conditions can be read on the (P,V) diagram. To establish total suppression, the injection must end at point (c) where $P=P_H$ and $V=V'_m$ given by equation (6) and the path $A \rightarrow B \rightarrow C$ followed by the injection must be such that the area under the curve is given by equation (5), or equivalently equal to the area D, D', C, C'.

When the minimum energy $E_a/k-1$ is used, the relationships expressed in (5) and (6) also yield:

$E_i = 0$ and $V'_m = V_m$

In this case, the injection must be instantaneous and must occur exactly at $V_m$ when the bubble reaches its original maximum volume $V_m$. On FIG. 16, the path followed by the injection is $D \rightarrow D'$: ideally the injection starts at point D $(V=V_m)$ and ends at point D' when the internal pressure is $P_i=P_H$.

This ideal case, (where the injected energy is exactly equal to the minimum energy $E_a/k-1$ and the injection is instantaneous and occurs exactly at $V_m$), can be considered as a limiting case where the injected energy is slightly larger than the minimum energy and the injection occurs around $V_m$. Such an injection can be represented on the (P,V) diagram by a straight line passing through the point $(V_m, P_H/2)$ as indicated by the path A, B, C of FIG. 17. It can be seen that such a path automatically satisfies the conservation of energy as indicated in FIG. 17: area (A, B, D)=area (B, C, D').

In this case, the injection starts at point A, where $V_1 < V_m$ and ends at C, where $V'_m > V_m$, and where both $V_1$ and $V'_m$ are very close to $V_m$. Stated in terms of time, the injection starts just before T/2 and ends just after T/2, while the volume of the bubble stays within a few percent of its maximum value.

It has also been found that in the above case, the energy $E_m$ spent before and up to $V_m$ is substantially equal to half the minimum energy or $$E_m \cong \frac{1}{2}\left(\frac{E_a}{k-1}\right)$$

It has also been found that the energy spent before $V_m$ and up to $V_m$ increases only very slowly with the energy ratio $E_b/E_a$. When this ratio is equal to its minimum value, $(1/k-1)$, then $E_m = \frac{1}{2}(E_a/k-1)$. E increases only by 14% when the energy ratio is multiplied by 2, and therefore already represents an important loss of efficiency in terms of energy for the overall process.

When the injected energy $E_b$ is larger than the minimum value $E_a/k-1$, generally the injection starts before the bubble reaches its initial maximum volume $V_m$, for instance, when its volume has a value $V_1 \leq V_m$, and ends when its volume reaches its new maximum value $V'_m > V_m$ as indicated on the (P,V) diagram of FIG. 16 by the path $A \rightarrow B \rightarrow C$. Thus all possible injections leading to a total suppression must satisfy the above equations (5) and (6), which in turn impose constrains on the possible ways the energy is released as a function of time.

FIG. 16 also illustrates that when only the work performed by the injected gas and the maximum volume $V'_m$ are considered, the path $A \rightarrow B \rightarrow C$ followed by any injection leading to total suppression is equivalent, and therefore can be replaced by the injection following the path $D \rightarrow D' \rightarrow C$ for which the injected energy is $E_b$. The same is true for path $A \rightarrow B \rightarrow C$; the work performed is $E_i$ given by equation (5) and the new maximum volume is $V'_m$ given by equation (6). Restated, the equivalent injection starts at D. When the bubble reaches its maximum volume $V_m$, an amount of energy equal to the minimum energy $E_a/k-1$ is injected instantaneously (Path $D \rightarrow D'$) to establish the hydrostatic pressure $P_H$ within the bubble, and then the injection is made along the path $D' \rightarrow C$ at hydrostatic pressure, since this path follows a reversible process it is consequently very slow.

In the equivalent injection, the minimum energy is instantaneously injected into the bubble when the bubble is at its maximum volume $V_m$, using a totally irreversible process $(D \rightarrow D')$, during which no work is performed by the injected gas. In this case, the excess of energy $E_b-(E_a/k-1)$ is slowly injected into the bubble along a reversible process $(D' \rightarrow C)$ for which the work performed is maximum and equal to $k-1/k$ times the energy injected during this phase, or $k-1/k$ times the excess of energy $E_b-(E_a/k-1)$. This equivalent injection depends only upon $E_b$, if $E_a$ is given, and therefore is the same for all the possible injections leading to a total suppression while using the same amount of injected energy $E_b$.

The equivalent injection represents a limiting case of all injections leading to a total suppression and is neither economically efficient, as a total bubble suppression is already achieved at D', nor practical, as a dramatic change in the injection rate is required at D', but it illustrates that in fact any injection leading to total suppression can be considered as a succession of two injections:

(1) one occurring around $V_m$ and having an energy equal to about the minimum energy $E_a/k-1$; and,
(2) a second injection occuring after $V_m$ up to $V'_m$ and having an energy equal to about the excess of energy $E_b-(E_a/k-1)$.

At any time during the injection, the energy E already injected into the bubble is split into two parts:

(1) The energy $\phi_i$ required to increase the internal pressure up to $P_i$, and
(2) The work $W_i$ performed by this internal pressure on the body of water:

$E = \phi_i + W_i$

It has been found that $W_i$ is only a small fraction of E, or in other words, the main proportion of the injected energy spent is used to increase the internal pressure of the bubble. More precisely, $W_i$ varies from 0 (totally irreversible process) to the maximum value $(k-1/k)$ E (reversible process). For air $W_i$ is at the most equal to 28.6% of the injected energy.

During the first phase of the injection which starts when the internal pressure is almost zero, the work performed is very small and almost all the energy spent is used to raise the internal pressure. As any change in the bubble's behavior depends only upon the work performed on the body of water by the internal pressure, it will be seen that during the first phase of an injection from volume $V_1$, when the injection starts, up to $V_m$, the behavior of the bubble depends mainly upon the original energy released $E_a$.

After $V_m$, the original energy $E_a$ has been transformed into the potential energy $P_H V_m$ of the body of water, and therefore after $V_m$, the behavior of the bubble depends only upon the injected energy $E_b$ and, more precisely, upon the excess of energy $E_b - (E_a/k - 1)$.

Stated another way, the ideal injection must be of such character so as:

(1) to prevent any collapse of the bubble after $V_m$ by establishing within the bubble an internal pressure close enough to $P_H$ around $V_m$; and, (2) to use the excess of energy to increase the internal pressure to $P_H$ and the volume to $V'_m$.

It has been found both theoretically and experimentally that the condition stated for a quasi instantaneous injection using the minimum energy or slightly above the minimum energy holds for all values of the injected energy.

In other words, in order to establish total suppression, any injection must be such that the amount of energy injected before the bubble passes through its maximum original volume $V_m$ and up to $V_m$ must be substantially equal to half the minimum energy or $\frac{1}{2}(E_a/k - 1)$;

$$E_m \simeq \frac{1}{2}\left(\frac{E_a}{k-1}\right)$$

4. The Time the Injection Starts $t_1$

FIG. 18 represents the variations of the dimensionless ratio $V'_m/V_m$ versus the energy ratio $E_b/E_a$ according to equation (6).

$$\frac{V'_m}{V_m} = \frac{k-1}{k} \frac{E_b}{E_a} + 1 \quad (6)$$

As may be seen, the graph is a straight line passing through the points $A_0$ (0, $k-1/k$) and $D'(1/k-1, 1)$, said line having a slope $k-1/k$.

When the injected energy increases above the minimum value $E_a/k-1$ the point representing $V'_m/V_m$ moves on the portion of the line above the starting point $D'$ which corresponds to the point $D'$ ($V_m$, $P_H$) of the diagram illustrated in FIG. 16. But the diagram illustrated in FIG. 18 may also be used to plot the reduced volume $V/V_m$ versus $E/E_a$ during the injection, where V is the volume of the bubble and E represents the energy injected at any instant during the injection. Such an injection leading to total suppression starts at point A where the volume is $V_1$ and the reduced volume $V_1/V_m$, passes through the volume $V_m$, (reduced volume $V_m/V_m = 1$) at point B and ends at point C for which the volume is maximum (dv=0) and has the reduced value $V'_m/V_m$.

As seen in FIG. 18, the equivalent injection follows the path $D \rightarrow D' \rightarrow C$ where the path $D \rightarrow D'$ represents an instantaneous injection of the minimum energy $E_a/k - 1$. The path $D' \rightarrow C$ represent a reversible injection where the internal pressure remains equal to $P_H$. Referring to this figure, it has been found that in accordance with the second law of thermodynamics, the slope of the curve $A \rightarrow B \rightarrow C$ cannot exceed $k - 1/k$ or the slope of the straight line. Accordingly, point A, when the injection starts, cannot be lower than the point $A_o$ of ordinate $k - 1/k$, or $$\frac{V_1}{V_m} \geq \frac{k-1}{k}$$

or translated into time by the well known relationship between $V_1/V_m$ and $t_1/T$ $$\frac{t_1}{T} \geq 0.12$$

In other words no injection starting before $t_1 = 0.12\ T$ can lead to any quasi-total suppression.

Specifically, this is the case of the injections described in U.S. Pat. No. 3,653,460, as issued to Chelminski, where the described injections start with the release of the first charge $E_a$ at $t=0$, and therefore A is practically 0. Experiments show that it is impossible with such injections to have a $P_2/P_o$ ratio less than 23%, which is generally unacceptable.

Therefore, any ideal injection must start at a point A between $A_o$ and D and follow a path $A \rightarrow B \rightarrow C$ and end at C where the tangent to the path is horizontal (dv=0). Furthermore the slope must never exceed $k-1/k$. Those conditions are narrowly limiting all possible paths, and for the conditions stated above, the equation:

$$E_m \simeq \frac{1}{2}\left(\frac{E_a}{k-1}\right)$$

defines the path which intersects the line $DD'$ at a point B for which:

$$E \simeq \frac{1}{2}\left(\frac{E_a}{k-1}\right)$$

It has been found that the curve ABC must be very close to the straight line BC, and therefore point A where the injection starts can be found simply as the intersection of the ordinate's axis with the straight line CB.

Expressed in terms of the energy ratio $E_b/E_a$, the ordinate of point A is found to be expressed by the equation:

$$\frac{V_1}{V_m} = 1 - \frac{1}{2k}\left[\frac{\left(E_b - \frac{E_a}{k-1}\right)}{\left(E_b - \frac{1}{2}\frac{E_a}{k-1}\right)}\right]$$

Translated into time by the known relationship between $V_1/V_m$ and $t_1/T$, when $t_1$ is the time when the injection starts:

$$\frac{t_1}{T} = \frac{1}{2} - \frac{1}{\sqrt{10k}}\left[\frac{\left(E_b - \frac{E_a}{k-1}\right)}{\left(E_b - \frac{1}{2}\frac{E_a}{k-1}\right)}\right]^{1/2} \quad (7)$$

These relationships have been found to accurately coincide with all experimental results up to the limit of the experiments for $E_b/E_a = 10$.

When $E_b$ increases to large values, $t_1/T$ tends toward a limit given by:

$$\frac{t_1}{T} = \frac{1}{2} - \frac{1}{\sqrt{10k}}$$

For air: $t_1/T = 0.23$, which has been supported by experimental results. In summation, $0.23 \leq t_1/T \leq 0.50$ where this $P_2/P_o$ ratio is equal or less than 5% (the quasi-ideal case.)

Since no assumption has been made on any special way the injection is made, the above results are general and apply to all possible injections leading to a total bubble suppression. FIG. 48 represents the variations of the more convenient dimensionless parameter ($\frac{1}{2} - t_1/T$) as a function of the energy ratio $E_b/E_a$.

5. Duration of the Injection

Given the total energy released $E_b$ and the time the injection starts $t_1$, the duration $\Delta t$ is the third parameter that characterizes an injection.

As noted above, for the ideal injection the new maximum volume $V'_m$ must be reached exactly at the end of the injection, emphasizing the importance of the duration $\Delta t$. Also the ratio $E_b/\Delta t$ represents the average rate at which the energy is injected as a function of time. This rate has been shown to be essential for ideal bubble suppression. It will be understood by those skilled in the art that the rate of injection $E_b/\Delta t$ must be tuned to the rate of expansion of the bubble $dv/dt$ that mainly depends upon the time $t_1$ at which the injection starts.

More precisely as shown in FIG. 20:
(a) If the rate at which the energy is released is too fast, and/or the injection starts too late, the pressure will first increase above the hydrostatic value, for $E_b > E_a/k - 1$ and finally at $V'_m$ the internal pressure will be below $P_H$, resulting in to some kind of secondary pressure pulse. FIG. 20a.
(b) If the rate is too slow and/or the injection starts too early the internal pressure will never reach the hydrostatic value $P_H$ and a secondary pressure pulse will be emitted as a consequence of a certain degree of collapse of the bubble. FIG. 20b.
(c) It is only when both the energy rate and the time the injection starts are correctly tuned that a total suppression can be achieved. FIG. 20c.

It has been found that the relationship between $t_1$, the time when the injection starts, and the duration $\Delta t$ of said injection, can be deduced from the conditions (a) and (b) and/or values of $E_i$ and $V'_m$ given by equations (5) and (6), in terms of the energies $E_a$ and $E_b$.

It is well known from the prior art that when a bubble having a constant internal pressure $\bar{p}$, expands from a volume $V_1$ to a volume $V'_m$, the time $\Delta t$ required to go from $V_1$ to $V'_m$ is a known function of $(p_H - \bar{p})$, $V_1$ and $V'_m$.

For an ideal injection, $V_1$ and $V'_m$ may be expressed in terms of $E_a$, $E_b$ and $V_m$ (see equation 6 or 7). An estimate of the duration of the injection $\Delta t$, can be made if it is assumed that between $V_1$ and $V'_m$ the internal pressure of the bubble is constant and equal to its actual average value $\bar{p} = E_i/(V'_m - V_1)$ where $E_i$ is given by equation (5).

It has been further found that in order to establish total suppression, the time the injection starts $t_1$, and the injection's duration $\Delta t$, must be related by:

$$\frac{\Delta t}{T} = \sqrt{\frac{10}{3}} \left[ \frac{(k-1)}{k^{1/3}} \right]^{5/6} \left( \frac{E_b}{E_a} \right) \left( \frac{E_a}{E_a + E_b} \right)^{1/6} \left( \frac{1}{2} - \frac{t_1}{T} \right)$$

or according to equation (7)

$$\frac{\Delta t}{T} = \frac{1}{\sqrt{3}} \left( \frac{k-1}{k} \right)^{5/6} \left( \frac{E_b}{E_a} \right) \left( \frac{E_b - (E_a/k - 1)}{(E_b - 1/2)(E_a/k - 1)} \right)^{1/2} \left( \frac{E_a}{E_a + E_b} \right)^{1/6} \quad (8)$$

For air $k = 1.40$ and the resulting coefficient is equal to 0.203.

Relationship (8) has been found to agree well with experimental results up to $E_b/E_a = 10$.

In this way it has been discovered that, for an ideal bubble suppression $P_2/P_o \leq 5\%$ the relative duration of the injection $\Delta t/T$ must be smaller than or equal to $K - 1 | 3$ times the energy ratio $E_b/E_a$.

$$\frac{\Delta t}{T} \leq \frac{k-1}{3} \frac{E_b}{E_a}$$

Restated, to achieve an ideal bubble suppression, the relative duration of the injection must at a maximum be equal to about $K - \frac{1}{3}$ times the energy ratio. For air, $$\frac{\Delta t}{T} \leq 0.14 \frac{E_b}{E_a}$$

the relative duration must be smaller or at the most equal to about 14% of the energy ratio.

6. Preferred Embodiment

As no assumptions have been made on the way the energy is released versus time, it will be understood that the above conclusions regarding:
(a) the minimum energy injected $E_a/K - 1$;
(b) the amount of energy to be injected before $V_m$ or ($\frac{1}{2}$) $E_a/k - 1$;
(c) the time the injection starts $t_1$; and
(d) the duration of the injection $\Delta t$ are independent of the way the energy is released.

Nevertheless, in the preferred embodiment the natural way of releasing the injected energy is used. In this preferred embodiment, the second charge of a highly pressurized gas is stored under pressure $P_b$ in a chamber having a volume $V_b$. The injected energy is proportional to the product $P_b V_b$.

At time $t_1$, the gas is allowed to flow into the bubble by the opening of a fast acting valve, said valve remaining open until all the gas has been transferred into the bubble. In this case the injection is defined by the three parameters:
(1) $E_b$, the energy of the injected gas, which is proportional to $P_b V_b$.
(2) $\theta$, the time constant of the injection.
(3) $t_1$, the time at which the injection starts.

As known in the art, when a pressurized gas having pressure $P_b$ and occupying volume $V_b$ is discharged from a given containment into a vacuum, the pressure within the containment decreases according to the exponential law:

$$P(t) = P_b e^{-\frac{t}{\theta}} \quad (9)$$

And accordingly, the energy released follows the law $$E = E_b (1 - e^{-\frac{t}{\theta}}) \quad (10)$$

In such a case, the time constant $\theta$ is a function of (1) the temperature and the nature of the gas and (2) the ratio $V_b/A_b$, where $V_b$ is the volume of the injector (earlier generically referred to as the containment), and $A_b$ is the cross-sectional area or the orifice through which the gas is flowing into said vacuum. For a given gas at a given temperature, $\theta$ is proportional to $V_b/A_b$ such that $$\theta = c (V_b/A_b) \quad (11)$$

where c is a constant expressed by $$c = \frac{1}{NR (T)^{1/2}}$$

where
N = coefficient of the orifice,
R = gas constant,
T = temperature.

It should be herein noted that $\theta$ does not depend on the pressure of the gas in the containment.

For practical applications, this time constant $\theta$ may be referred to as a "technical" parameter since several operating conditions may dictate the relative size of $\theta$. For example, when the gas injection takes place close to T/2, gas must be rapidly evacuated from the injector. This rapid flow requirement dictates that the cross-sectional area $A_b$ of the orifice in the injector must be relatively large. Hence and by reference to Equation (11), $\theta$ would be quite small. Specifically referring to this same example, however, when a very rapid injection of gas is desired, gas flow through the orifice must take place in a matter of a few milliseconds—or less. Such instantaneous release and flow requires technically sophisticated valves whose operation under such conditions often leads to problems. Alternatively, a valve having a smaller area $A_b$ is generally easier to operate.

In consequence of the above, to achieve ideal bubble suppression, the parameters $E_b$, $\theta$, and $t_1$ must satisfy the two conditions of (a) and (b) above, namely, $P_i = P_H$ when $dv = 0$. These absolute relationships enable the operator to arbitrarily select one given operating parameter and tailor the pulse signature utilizing the remaining two parameters.

For example, the time $t_1$ (defined as that time when the injection starts) is limited to the range 0.2 T–0.5 T (for ideal suppression), since the injection must at least begin before the bubble begins to implode—this occurring at 0.5 T. Hence, $t_1$ may be arbitrarily chosen (within the stated range) by the operator. Alternatively, the gas energy $E_b$ or the time constant of injection $\theta$ may also be randomly chosen by the operator. As illustrated by both equation (7) and (8), as soon as one parameter $E_b$, $\Delta t$, or $t_1$ has been chosen, the other parameters are generally determined.

The gas energy $E_b$ represents a logical starting parameter since $E_b$ ultimately represents the cost of the injection in terms of both pressure and volume. For increasing pressures, larger and more powerful compressors will be necessary. Conversely, a larger volume $V_1$ requires a larger injector volume.

A. TUNING (1) Ideal Suppression

It has been discovered both theoretically and experimentally, that an quasi ideal bubble suppression (i.e.—$P_2/P_o \leq 5\%$) can be achieved by properly "tuning" the parameters of injection, i.e. $E_b$, $\theta$, and t. These parameters are manipulated within the basic behavioral parameters of the bubble, i.e.—the energy of the bubble $E_a = P_H V_m$ and the period of oscillation of said bubble or period T.

It has been further discovered that when such tuning is implemented, then, at the end of the injection at a time $t_2$, when all the energy of the injection has been transferred into the bubble, the bubble has reached its (new) maximum volume $V'_m$ and its internal pressure $P_i = P_H$. It has been discovered that such tuning is possible for very broad ranges of both the injected energy $E_b$ and the time constant $\theta$. In this, it has been discovered that $E_b$ may have any value greater than a set minimum, and that $\theta$ may have any value as long as the ratio $\theta/E_b$ is smaller than a given maximum value. As noted, for totatl bubble suppression, $t_1$ must be greater than a minimum (0.2 T) and smaller than 0.5 T.

For the preferred embodiment the time $t_1$ is given as in the general case by relationship (7).

In this case and according to equation (9) the duration of the injection for which both the containment and the bubble are under the same pressure $P_H$ is theoretically infinite. In practice $\Delta t$ can be chosen equal to 2.2 $\theta$, or 2.2 times the time-constant $\theta$, which corresponds to the time needed for the injected energy to grow form 10% of the total energy to 90% of the total energy $E_b$.

Setting $\Delta t = 2.2\ \theta$ in formula (8) for air, will lead to:

$$\frac{\theta}{T} = 0.09 \left(\frac{E_b}{E_a}\right) \left[\frac{E_b/E_a - 2.5}{E_b/E_a - 1.25}\right]^{1/2} \left(\frac{1}{E_b/E_a + 1}\right)^{1/6} \quad (12)$$

The third term after the coefficient decreases only slowly when the energy ratio increases from its minimum valve 2.5, and this term can be considered as a correcting term. When the energy ratio increases from its minimum value 2.5 at the beginning, the dominant term is the second term and therefore $\theta/T$ increases rapidly, more rapidly than $E_b/E_a$.

When the ratio $E_b/E_a$ reaches a value of about 5, the value represented by the second term levels off and $\theta/T$ is almost proportional to $E_b/E_a$:

$$\frac{\theta}{T} \simeq 0.06 \frac{E_b}{E_a},$$

which represents the tangent from the origin.

If the increase of injected energy $E_b$ is due to the increase of the volume $V_b$, the pressure $P_b$ remaining constant, then (11) can be reformulated:

$$\theta = C \cdot \frac{E_b}{A_b} \quad (11')$$

It can be seen that when the energy ratio $E_b/E_a$ is between 2.5 and about 5, $\theta$ must increase faster than $E_b$, and thus the cross-section area $A_b$ must be decreased.

When the energy ration $E_b/E_a$ is equal or larger than about 5, (11') illustrates that $A_b$ must remain constant, and the increase of $\theta$ needed for tuning will be solely a consequence of the increase in the volume $V_b$ needed to increase the energy $E_b$. This rather surprising behavior has been established experimentally.

It has been discovered both theoretically and experimentally that:

(a) When the injected energy $E_b$ is between the minimum energy $E_a/k-1$ and about twice this minimum $2E_a/k-1$ or for air, for example, when $E_b$ is between 2.5 $E_a$ and $5E_a$, then the area $A_b$ must be reduced when the energy $E_b$, or the volume $V_b$ increases, to stay tuned to the energy.

(b) When the injected energy $E_b$ is larger than about twice the minimum energy $E_a/k-1$, then the value of the time constant $\theta$ for which a total bubble suppression can be achieved is about proportional to $V_b$. Therefore, the area $A_b$ must remain constant when the increase in energy is obtained by an increase of the volume $V_b$ at a constant pressure $P_b$.

(c) The relative time constant $\theta/T$ is smaller than or equal to about 0.06 times the energy ratio $E_b/E_a$ for air, or generally $(k-1/6.6)$ times $E_b/E_a$.

Figure 19:
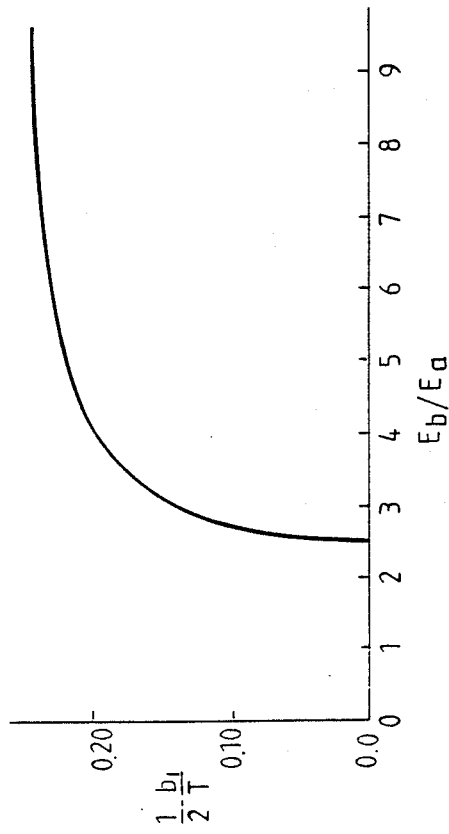
FIG. 19 graphically represents the curve described by equation $$\frac{1}{2} - \frac{t_1}{T} = \frac{1}{\sqrt{10K}} \left[ \frac{E_b - \dfrac{E_a}{k-1}}{E_b - \dfrac{1}{2}\dfrac{E_a}{k-1}} \right]^{1/2}$$

All tests achieving results $P_2/P_o \leq 5\%$ closely follow the lines representing the relationships (7) and (12) as indicated in FIGS. 19 and 20.

By way of example only, in a series of experiments the cross-section area $A_b$ was reduced from 6.14 in$^2$ (40 cm$^2$) to 0.85 in$^2$ (5 cm$^2$) when the energy ratio was increased from about 2.5 to 5. The cross-sectional area was kept constant at 0.85 in$^2$ (5 cm$^2$), while the energy ratio was increased from 5 to 10, by increasing the volume $V_b$ while the pressure $P_b$ remained constant at about 2000 psi (140 bars) according to equations (8) or (12) as indicated in FIG. 20.

Figure 22:
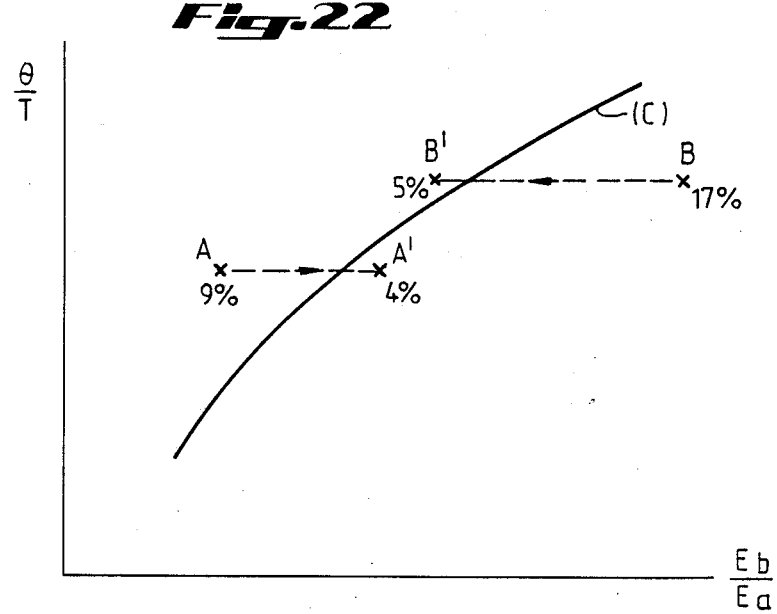
FIG. 22 graphically represents two methods for tuning $\theta/T$ to $E_b/E_a$.
Figure 23:
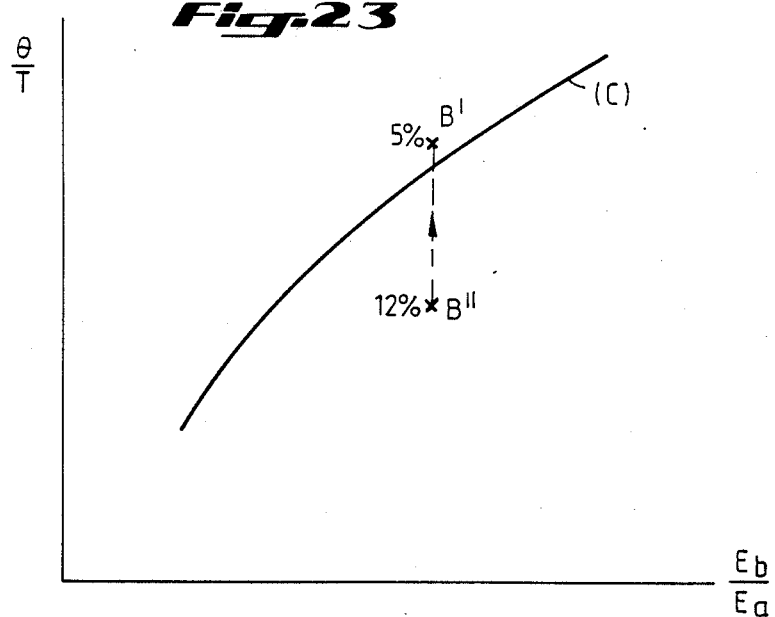
FIG. 23 graphically represents yet a third method to tune $\theta/T$ to the energy ratio $E_b/E_a$.

Referring to FIGS. 22 and 23, it is shown how the three parameters, (1) the relative time constant $\theta/T$, and (2) the ratio of energy $E_b/E_a$; and the time $t_1$, can be modified or "tuned" to achieve an acceptable $P_2/P_o$ ratio.

EXAMPLE 1

In a first experiment a $E_b/E_a$ ratio of 2.33 was achieved, where

| $P_a$ = 2000 psi | $P_b$ = 2000 psi |
|---|---|
| $V_a$ = 45 in$^3$ | $V_b$ = 105 in$^3$ |

This ratio is smaller than the minimum energy ratio of 2.5 earlier recited. For this experiment, the relative time constant was $\theta/T=0.073$ yielding a point A as seen in FIG. 22. As seen in this Figure, point A is above curve C for ideal tuning, where C represents the equation (12).

In this example, before tuning, $P_2/P_o$ was equal to 9%. By increasing the pressure in the injector's chamber from $P_b=2000$ psi to $P_b=2500$ psi, the energy ratio was brought to $E_b/E_a=2.92$. The relative time constant $\theta/T$ remained constant at 0.073. The tuned improvement is seen at point A', and the ratio $P_2/P_o$ has been reduced to 4%.

EXAMPLE 2

In a second experiment where,

| $P_a$ = 2000 psi | $P_b$ = 2500 psi |
|---|---|
| $V_a$ = 45 in$^3$ | $V_2$ = 210 in$^3$ |

A ratio $E_b/E_a$ was established at 5.83 where the ratio $\theta/T=0.28$. This value is represented at point B in FIG. 22, well below ideal curve C. Using the above parameters, a $P_2/P_o$ ratio was established at 17%. By decreasing the pressure of the injected gas $P_b$ from 2500 psi to 2000 psi, the $E_b/E_a$ ratio is decreased from 5.83 to 4.66, again without changing the ratio $\theta/T$. After correction, the $P_2/P_o$ ratio was decreased from 17% to 5%. This "tuned" value is represented at point B' in FIG. 22.

EXAMPLE 3

In a third experiment, where

| $P_a$ = 2500 psi | $P_b$ = 2500 psi |
|---|---|
| $V_a$ = 45 in$^3$ | $V_b$ = 210 in$^3$ |

A $E_b/E_a$ ratio of 4.66 was established yielding a relative time constant of $\theta/T=0.25$, due to the increase of the period T with the pressure in the generator ($P_a=2500$ psi). The $P_2/P_o$ ratio was established at 12%. The representative point for this valve is represented at point B'' in FIG. 23. By decreasing both pressure $P_a$ and $P_b$ down to $P_a=2000$ psi, B'' was effectively "tuned" to where the ratio $E_b/E_a$ was unchanged and equal to 4.66. In this case also, the period T was reduced from T=98 msec down to T=90 msec so that the ratio $\theta/T$ was increased from $\theta/T=0.25$ to $\theta/T=0.28$. As shown in FIG. 23, this "tuning" results in a new $P_2/P_o$ ratio of 5% as shown at point B'.

As illustrated in the above examples, there exists a variety of methods to improve or "tune" a given pressure pulse proximate to the desired $\theta/T$, $t_1/T$ and $E_b/E_a$ values, so as to result in a commercially feasible $P_2/P_o$ value.

To summarize:

When the ratio $\theta/T$ is properly tuned to the energy ratio $E_b/E_a$, then the time when the injection starts or more conveniently the ratio $t_1/T$ needs to be optimized or tuned to the same energy ratio $E_b/E_a$.

Figure 24:
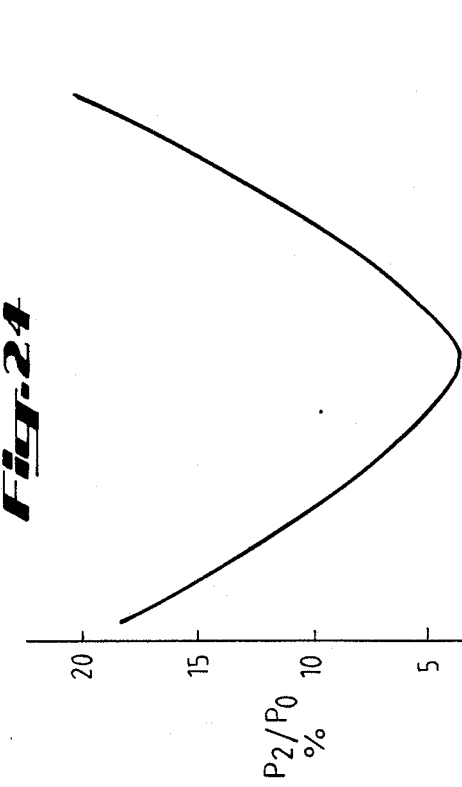
FIG. 24 graphically represents the variations of $P_2/P_0$ versus $t_1/T$.

By way of example, FIG. 24 illustrates how the amplitude ratio $P_2/P_o$ changes with the value of $t_1/T$. In this example:

| $P_a$ = 2000 psi | $P_b$ = 2000 psi |
|---|---|
| $V_a$ = 45 in$^3$ | $V_b$ = 280 in$^3$ |
| $E_b/E_a$ = 6.22 | $\theta/T$ = 0.38 |

The optimum tuning is reached when $t_1/T=0.24$ and then $P_2/P_o=3.5\%$.

It should be noted in FIG. 24 that a relatively wide range of variations for $t_1/T$: from 0.19 to 0.27 are allowable and the ratio $P_2/P_o$ still remain below or equal to 5%.

Time Constant $\theta/T$ can be increased (or decreased) by changing the area $A_b$ by which the injected gas is flowing from the injection chamber. In such a case, T, $E_a$ $E_b$ will remain constant. This can be accomplished by varying the cross-sectional area of the orifice at the outlet of the injection chamber itself.

Energy of the injector $E_b$ can be increased (or decreased) by increasing (or decreasing) the volume $V_b$ while the pressure $P_b$ remains constant. In such a case, $\theta$ and therefore $\theta/T$, will increase proportionately.

$E_b$ can also be increased (or decreased) by increasing (or decreasing) the pressure $P_b$ while the volume $V_b$ remains constant. In such a case, $\theta$ will remain constant.

Energy of the Generator $E_a$ can be increased (or decreased) to change the ratio $E_b/E_a$. When $E_a$ is changed, however, T will also vary according to the relationship $T = m (E_a)^{\frac{1}{3}}$. In such a fashion, the ratio $\theta/T$ will similarly vary like $E_b/E_a$, but at a different rate.

Period

The period T can also be used for the tuning of the ratio $\theta/T$ or $t_1/T$ to $E_b/E_a$.

Time for Injection, $t_1$

As earlier noted, to achieve complete suppression gas injection must begin before 0.5 T (or at 0.5 T assuming instantaneous injection) as soon as $E_b/E_a = 2.5$. When the energy of the injected gas is close to its minimum value, the volume of the bubble must be at its maximum value or very close to it. Near the maximum volume, the volume of the bubble varies only very slowly with time. For example, during the period of time from 0.4 T to 0.6 T, the volume of the bubble remains within 5% of its maximum value. If the injection occurs rapidly enough, (ideally instantaneous), the time at which this injection is made can vary in a relatively wide range, for instance, bewteen 0.4 T and 0.6 T, due to the stability of the volume when it is close to the maximum. Consequently the time $t_1$, or more conveniently the ratio $t_1/T$, will vary rapidly around the minimum energy ratio $E_b/E_a = 2.5$ (for air).

The applicant has discovered both theoretically and experimentally that due to the interference between the energy of the injected gas $E_b$, the time constant $\theta$, the value $V_1$ reached by the bubble when the injection starts at time $t_1$, and the velocity $V_1$ ($dv_1/dt$) at time $t_1$, to achieve a commercially viable bubble suppression $t_1$ decreases to a minimum value at about 0.23 T. Therefore, for complete bubble suppression ($P_2/P_o \leq 5\%$), the time $t_1$ when the injector starts should preferably begin within the range 0.2 T and 0.5 T.

(2) Acceptable Bubble Suppression

It has been found that the above conditions for quasi-ideal suppression may be widely extended should the ratio $P_2/P_o$ be allowed to increase to an acceptable level higher than 5%.

By way of example it can be seen on the experimental curve of FIG. 24 that for an energy ratio $E_b/E_a = 6.22$ and a correctly tuned relative duration $\Delta t/T$ (or relative time constant $\theta/T$, the time the injection starts $t_1/T$ when ideally tuned at $t_1/T = 0.24$ leads to a $P_2/P_o$ ratio of $P_2/P_o = 3.5\%$.

But when the ratio $P_2/P_o$ is allowed to reach 10% or less, then the ratio $t_1/T$ can be chosen within the limits 0.12 T–0.35 T as illustrated on FIG. 24.

Should the ratio $P_2/P_o$ be allowed to stay below or equal to 15%, the same ratio $t_1/T$ would have a range 0.05 T–0.35 T as illustrated on FIG. 24.

In order words the relationship (7) and the representation of FIG. 19, are ideal or quasi-ideal conditions leading to a total bubble suppression or $P_2/P_o$ equal or near zero $P_2/P_o \simeq 0$.

When the ratio $P_2/P_o$ is allowed to increase—for instance up to 15%, which represents an average value of what an air gun array yields in standard condtions—then the curve of FIG. 19 should be replaced by an allowable zone extending on both sides of the curve, or a strip, and the width of the strip will depend upon the maximum range allowable for the ratio $P_2/P_o$.

By reference to FIG. 24, the general shape of the curve representing the variations of the ratio $P_2/P_o$ versus $t_1/T$, holds for all energy ratio $E_b/E_a$ and all values of the ratio $\Delta t/T$ or $\theta/T$. But the ordinate of the vertex, or the minimum value of the ratio $P_2/P_o$, will depend upon the tuning of $\theta/T$ to the energy ratio $E_b/E_a$.

By way of example, reference is made to the following experiment:

| | |
|---|---|
| $P_a$ = 2,000 psi | $P_b$ = 2,000 psi |
| $V_a$ = 45 in$^3$ | $V_b$ = 150 in$^3$ |
| $E_b/E_a$ = 3.33 | $\theta/T$ = 0.21 | for which $A_b = 0.85$ in$^2$, the optimum value for $t_1/T$ was found to be $t_1/T = 0.30$ and $P_2/P_o$ has a minimum value at $P_2/P_o = 8\%$.

Figure 21:
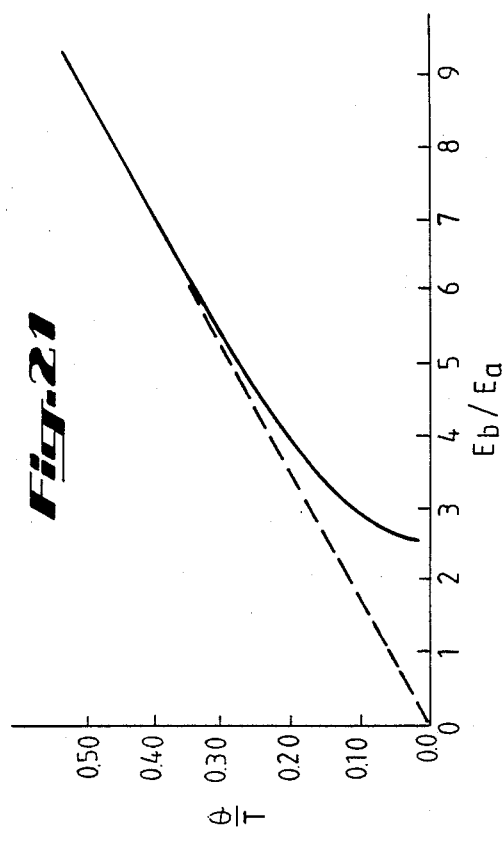
FIG. 21 graphically represents the curve $\theta/T$ as a function of the energy ratio $E_b/E_a$.

For $E_b/E_a = 3.33$ the curve of FIG. 21 gives an ideal value for $\theta/T$ equal to 0.15, lower than the actual measured value of 0.21, indicating that the actual injection's rate was not large enough.

By increasing the cross-section area $A_b$ from $A_b = 0.85$ in$^2$ to $A_b = 1.10$ in$^2$ a minimum ratio $P_2/P_o = 4\%$ was achieved for a time ratio $t_1/T = 0.30$, where the ratio $\theta/T$ was established at 0.17 closer to the ideal value of 0.15.

As shown in the above example the relationship (8) or (12) and the representation of FIG. 21, are the ideal conditions leading to $P_2/P_o \simeq 0$. Whenever the ratio $P_2/P_o$ is allowed to increase the curve of FIG. 21 may be replaced by an allowable zone or strip extending on both sides of the curve, the width of which will depend upon the maximum range allowed for the ratio $P_2/P_o$.

As it will appear to those skilled in the art, the only comparable single source, the air gun, yield an average bubble to primary ratio $P_2/P_o$ of about 70%.

As said above an average value for the new-used air gun arrays can be established at about 15% in standard conditions, but the actual value of $P_2/P_o$ from shot to shot is rather erratic as a result of depending upon the tuning of a multitude if different sources.

With a source according to the invention, in many instances a ratio of 15% or even 20% is acceptable, because the oscillating tail represents a smooth, monochromatic, stable oscillation as compared to the violent behaviour of an air gun's oscillation.

This mono frequency signal is useful for very deep penetration where all other higher frequency components have been absorbed by the earth, and can be easily processed as a single frequency signal.

It will be apparent to those skilled in the art that according to the above disclosure the terms tuning or adjusting should be understood in light of a previous choice of a maximum value allowable for the ratio $P_2/P_o$.

In other words the tuning between the three parameters $E_b/E_a$, $\theta/T$ and $t_1/T$ must be considered in accordance with the maximum value of the ration $P_2/P_o$ to be achieved.

As recited earlier the conditions for ideal bubble suppression are:

(a) when the bubble reaches its new maximum volume, characterized by $dv=o$ then,
(b) the internal pressure must be equal to the ambient hydrostatic pressure $P_H$, As noted, the above conditions must be reached at the end of the injection.

For a non-ideal injection it could happen that when the volume stops increasing ($dv=o$) and the internal pressure is about the hydrostatic pressure a part of the energy, normally small compared to the total energy of the injection, remains to be injected into the bubble. This injection's tail will increase the size of the bubble while the internal pressure remains about the hydrostatic value $P_H$, this phase of the injection following an almost reversible process represented on FIG. 20C by the path C→E, where the volume is increased from $V'_m$ to $V_{41\ m}$.

Because in this case the volume $V'_m$ is no longer a maximum but rather is stationary (with $dv=o$), the term "stationary" will be herein used as a more general term than "maximum". When the volume is stretched from $V'_m$ to $V''_m$, normally the rate at which the volume increases is small and therefore no significant pressure pulse is emitted during this phase.

Figure 25:
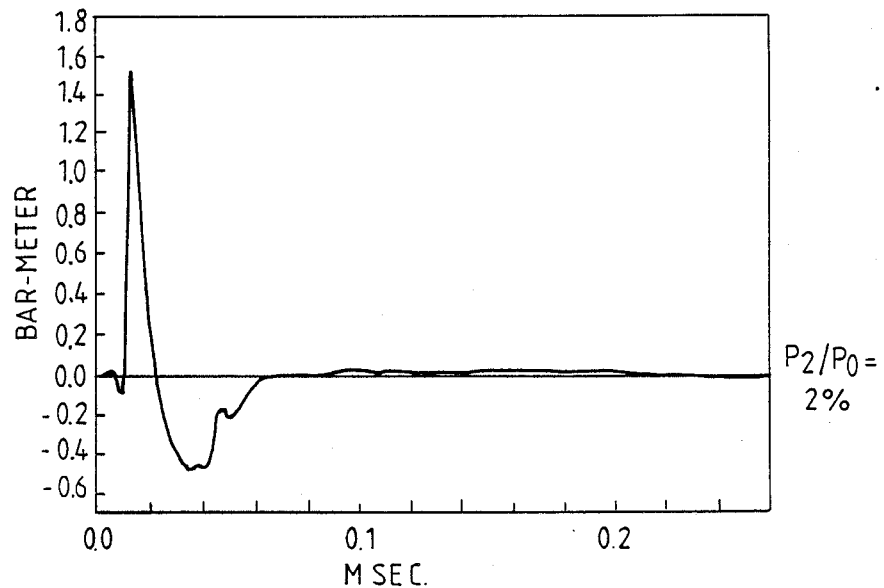
FIG. 25 is a pressure signature according to the present invention and illustrating the bubble stretching.
Figure 26:
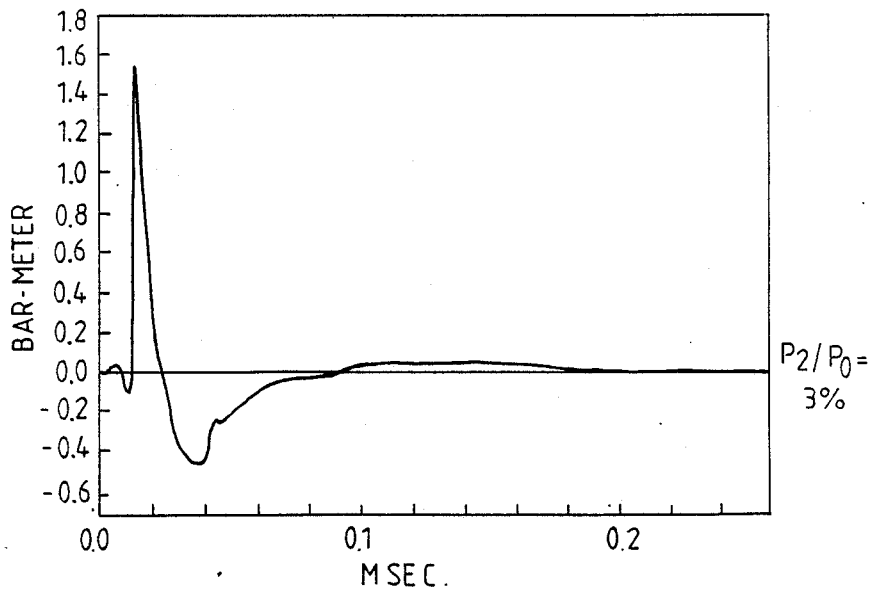
FIG. 26 is a pressure signature according to the invention and using a large energy ratio.

In this way, an excess of energy can be dissipated provided that the ideal conditions (a) and (b) have already been established. FIG. 25 illustrates this behavior, where at time 0.08 the internal pressure reaches the hydrostatic value $P_H$ and remain there for a few milliseconds before the bubble resumes its expansion, eventually emitting a secondary pressure pulse that does not exceed 2% of the primary pulse.

So as shown in this example, for the condition of a given injection $t_1/T$ and $\theta/T$, the energy ratio can vary within a range that depends upon the acceptable $P_2/P_o$ ratio. Typically a 20% variation the energy ratio can be allowed and can be dissipated by the stretching of the bubble, resulting in a corresponding increase in volume.

Basically when the three basic parameters $E_b/E_a$, $t_1/T$ and $\theta/T$ and not ideally tuned, the first consequence will be that when the volume reaches its new maximum value $V'_m$, the internal pressure $P'_m$ is less than the hydrostatic pressure $P_H$, and therefore the bubble will start to collapse and therefore emit a secondary pressure pulse.

The magnitude of this secondary pressure pulse will depend on the magnitude of the difference $p_H - P'_m$. For given values of $E_b/E_a$, $t_1/T$ and $\Delta t/T$, the internal pressure will reach a value of $P'_m$ when the volume reaches its maximum value $V'_m$. Therefore, if $P'_m \neq P_H$, a secondary pressure pulse will be emitted, with a amplitude ratio $P_2/P_o$ being a function of the established basic parameters $E_b/E_a$, $t_1/T$ and $\Delta t/T$.

It has been found theoretically and experimentally that the ration $P_2/P_o$ depends upon the parameters of the injection $E_b/E_a$, $t_1/T$ and $\Delta t/T$ by a relationship in the form:

$$P_2/P_o = (P_H/P_a)^{\frac{2}{3}} f(E_b/E_a, t_1/T, \Delta t/T)$$

It has been surprisingly discovered that the same type of relationship holds when no injection is performed (as no injection can be considered as a special injection for which $E_b=o$), and therefore holds true for the use of a single air gun.

All published results on the measurement of air gun signatures when the firing pressure $P_a$, the hydrostatic pressure $P_H$, or the depth are changed, display the effect of this factor $(P_H/P_a)^{\frac{2}{3}}$.

For instance, the following table illustrates the value of the product $(P_2/P_o) \times (P_a/P_H)^{\frac{2}{3}}$ for a single air gun having a volume $V_a = 45$ in$^3$ and a firing pressure $P_b = 2,000$ psi, fired at different depths ($P_H$):

| D (m) | $P_2/P_o$ | $P_a/P_H$ | $(P_2/P_o) \times (P_a/P_H)^{\frac{2}{3}}$ |
|---|---|---|---|
| 1.5 | 0.59 | 120 | 14.2 |
| 3 | 0.64 | 107 | 14.0 |
| 6 | 0.72 | 87 | 14.4 |
| 9 | 0.80 | 73 | 13.6 |
| 12 | 0.86 | 63 | 13.8 |
| 15 | 0.87 | 56 | 13.0 |

This table shows that the product remains constant at $13.8 \pm 5\%$.

In the above example the effect of the ratio $(P_a/P_H)$ is to actually decrease the ratio $P_2/P_o$ when the firing depth is reduced.

In the case of a single air gun the magnitude of $P_2/P_o$ is large and therefore the effect of $(P_a/P_H)^{\frac{2}{3}}$ is of no consequence. But when the bubble ratio $P_2/P_o$ has been already reduced according to the above disclosure, then a further reduction can be achieved by reducing the ratio $P_H/P_a$, more specifically by increasing $P_a$, or decreasing $P_H$—or the firing depth—or both. For example when the pressure in the generator $P_a$ is increased from 2000 psi to 5000 psi, at the same depth the ratio $P_2/P_o$ can be reduced by a factor $(5000/2000)^{\frac{2}{3}} = 1.8$. Also by firing the same source at 5 ft. (1.5M) instead of 50 ft. (15M), a reduction by a factor of $(2.5/1.15)^{\frac{2}{3}} = 1.6$ can be expected for the ratio $P_2/P_o$.

As shown in the above disclosure, the three injection's parameters $E_b/E_a$, $t_1/T$ and $\Delta t/T$ (or $\theta/T$) can be tuned to achieve almost any value of bubble suppression as required for any desired use.

In practical applications it could happen that detuning effects of some hidden parameters seems to alter the conculsions of the present invention.

For example and as earlier noted, the energy $E_b$ represents the energy actually injected within the bubble. In some instance, the energy actually injected within the bubble could be substantially different from the energy stored in the suppressor. This occurs, for example, if too large a portion of the energy stored in the suppressor is spent or dissipated in friction or turbulence before actually being injected into the bubble. A similar event might be true if a substantial part of the energy stored is used to activate the valve.

Additionally, the time $t_1$ when the injection starts represents the time when a substantial amount of gas starts to flow into the bubble itself. It could be the case, however, that this instant is somewhat different from the time the suppressor starts to depressurize. This might occur if too large a dead volume is located between the suppressor and the bubble itself, or if the flow is delayed by the friction caused by the design of the injector.

Further the duration of the injection could be altered by the behavior of the opening valve or by a restriction occurring in the fluid flow, etc.

Thus although the value of some of the parameters may vary with the specific technology used to embody the present invention, it will be understood by those skilled in the art that they will remain in the scope of the invention as disclosed above.

Acoustic Generator

The acoustic marine source of the present invention may be illustrated by reference to FIGS. 5–12A. In the claimed invention one can employ, for example, a conventional explosive signal generator 10 (FIG. 5) for generating at a predetermined and sufficient depth within a body of water a signal explosion, which produces at time t=o, a bubble 1 and a desired primary pulse having an amplitude $P_o$ (FIGS. 1, 2). In the absence of any suppression as previously described, bubble 1 would undergo a series of implosions and explosions (FIG. 1) at an oscillating period T, which would result in the undesirable secondary peaks (P2, P4 ...) of decreasing amplitude (FIG. 2).

To abort the first implosion, a suppressor generator 10' is utilized which injects a charge of highly pressurized gas inside bubble 1. This injection is generated within a time internal satisfying the aforereferenced conditions.

Explosive signal generator 10 can be a commercially available air gun, such as the one manufactured under the trademark PAR, which is fully described in U.S. Pat. No. 3,379,273. Such an air gun has a signal chamber 14 whose volume Va is charged up with pressurized air G1. Chamber 14 communicates directly with an explosive shuttle valve 12 that can be actuated to explosively discharge the pressurized air G1 from signal chamber 14 into the surrounding body of water through discharge ports 42.

Valve 12 includes a main piston 70 engageable with a seal 31 for retaining a charge of pressurized gas G1 within signal chamber 14, and a control piston 72 engageable with a seal 71 for controlling the movements of piston 70. Pistons 70 and 72 are held together, in spaced parallel relation, by a hollow shaft 70' having an axial bore 33 therethrough.

A compressor on the deck of the seismic vessel (not shown) supplies air pressure to input line 22 at 2000 psig, which is fed to a control or return chamber 32 from which it passes through a metering orifice 44 and axial bore 33 into signal chamber 14.

The actuation of valve 12 is controlled by a controller such as a solenoid-operated valve 20, which is energized periodically by a short electric pulse produced by a conventional electronic actuating network (not shown) located on the deck of the seismic vessel. The firing of explosive generator 10 is periodically repeated as dictated by the firing cycle of the seismic survey.

When solenoid valve 20 is fired, pressured gas flows from a line 22 through a trigger passage 39 leading to the opposite surface of control piston 72 from that facing control chamber 32. Thus, the holding force of the air pressure in control chamber 32 becomes instantaneously offset, allowing the pressurized gas G1 in the signal chamber 14 to suddenly accelerate main piston 70 away from its seal 31, thereby suddenly opening the discharge ports 42 and allowing them to communicate directly with signal chamber 14.

Then, the pressurized gas G1 from signal chamber 14 is explosively released through discharge ports 42 into the surrounding water wherein it generates a long acoustic seismic wavelet or pressure signature (FIG. 2) having the desired acoustic primary Pulse $P_o$, which is followed by the undesired positive (P2, P4 ...) pressure pulses.

After the discharge of gas G1 from signal chamber 14, the pressure in control chamber 32 returns shuttle 12 to its closed position, and generator 10 is ready for a new cycle.

A deflector 15 removably couples then together. A removable plate 67 having an orifice—disposed at its center of area $A_b$, is secured to the deflector 15. The area $A_b$ can be easily changed (by interchanging the plates) to "tune" the time constant $\theta$ of the discharge of the suppressor 10'b, with the suppressor volume and pressure. Other means to vary this area $A_b$ are also envisioned, such as a ball valve, a butterfly valve, etc. The cylindrical housing 73 of deflector 15 defines signal chamber 14 as well as four outlet ports 66 (FIGS. 5, 9), which preferably make a 60° angle with the vertical or longitudinal axis and preferably are angularly aligned with discharge ports 42. Signal chamber 14 of generator 10 is charged up from inlet line 22.

The suppressor generator 10'b is more fully described in French patent 2,158,730. Housing 74 of generator 10'b defines a suppression chamber 14'b which is filled from inlet 22'. Valve 12'b slides on a piston 52 and is pneumatically operated through inlet lines 57 and 58 which are different pressures. Inlet 57 supplies the triggering chamber 54 with 1000 psi, and inlet 58 supplies the return chamber 56 with 70 psi.

At the start, a pulse signal is sent on line 11 to solenoid 20 which allows valve 12 to open explosively. A delayed electric signal is then sent to solenoid valve 20' on line 11' inside conduit 58. The delay is 5 ms.

When activated, valve 12'b opens to allow air G2 from suppression chamber 14'b to become rapidly released into bubble 1 through ports 66 of deflector 15.

Chamber 14 is repressurized after 60 ms, and chamber 14'b is repressurized after 1 second.

The minimum ratio PbVb/PaVa is equal to about 1.8 where Vb is the volume of chamber 14'b, and Pb is the pressure of the gas filling it. Pa is the pressure of the gas filling said chamber (14) and Va is the volume of chamber 14.

I. DETAILED DESCRIPTION OF ONE OPERATING CYCLE

PHASE 1. Generator 10 Ready to Fire

Generator 10 (FIGS. 5, 6) and generator 10'b are armed.

Solenoid valves 20 and 20' are closed.

Shuttle valves 12 and 12'b seal off respectively signal chamber 14 and suppression chamber 14'b.

Source B is pressurized:
P14 = P33 = P32 = 2000 psi.
P14'6 = 3000 psi.
P39 = P55 = Ph (hydrostatic pressure) = 17 psi.
P56 = 105 psi.
P54 = 1500 psi.
Volumes:
Va = 14 + 33 = 45 in³.

$V_b = 14'b = 150 \text{ in}^3$.
Area $A_b = 0.85 \text{ in}^2$.
$E_b/E_a = 5$.

PHASE 2. Generator 10 Exploded and $P_o$ Generated

At time t=0 (FIGS. 7, 7A).

Firing is initiated by energizing solenoid 20 of generator 10 with a short electric pulse on line 11.

Shuttle 12 moves up explosively to allow the compressed gas G1 from signal chamber 14 to discharge through ports 42 into the surrounding water.

This explosive air release generates the primary acoustic pulse $P_o$ on the pressure signature.

Bubble 1 is expanding (FIG. 3).

PHASE 3. Bubble 1 Is Still Expending and Encompasses Ports 66

At t=20 msec (FIGS. 8, 8A).

Bubble 1 encompasses ports 66.

Pressure inside bubble 1 is much less than hydrostatic pressure; actually the bubble, at this instant, can be considered as a vacuum cavity.

A negative pulse P1 appears on the pressure signature.

Generator 10'b is still in stand-by.

PHASE 4. Generator 10'b is Opened-Gas G2 Injected Into Bubble 1

At $t_1 = 27$ msec (FIGS. 9. 10, 10A).

After a delay of 27 msec, depending upon the volume $V_a$ pressure Pa of this gas in chamber 14, water depth, and/or volume and air pressure in chamber 14'b, solenoid 20' is also energized via line 11'.

The gas G2 in triggering chamber 54 is sent to chamber 55 through solenoid valve 20'.

The force on shuttle 12'b reverses, causing it to explosively move downwardly.

The gas G2 from suppression chamber 14'b is released into bubble 1 through orifice in plate 67 deflector ports 66 which are encompassed thereby.

The acoustic pressure signal shows an upward slope on the pressure signature.

PHASE 5. Hydrostatic Pressure Established Inside Bubble

At $t_2 = 63$ ms (FIGS. 11, 11A).

$E_b/E_a$, $A_b$, and $t_2$, were selected so that gas in chamber 14'b can establish hydrostatic pressure inside bubble 1 at this time.

The amplitude of the acoustic signal is zero.

Shuttle 12 of generator 10 moves downwardly and seals against ring 31, because of the 2000 psi pressure in return chamber 32.

PHASE 6. Bubble 1 Is Stabilized At Its Equilibrium Position

The implosion of bubble 1 has been aborted.

Bubble 1 is stabilized and its boundary undergoes very low amplitude oscillations (FIGS. 12, 12A) which generate a negligible low-amplitude acoustic signal. $P_2/P_o = 2\%$.

Shuttle valve 12'b recocks because of the pressure in return chamber 56. Pressure in triggering chamber 54 is vented outside through a small orifice (not shown).

Source B is repressurized and made ready for another cycle.

What is claimed is:

1. A method for generating within a body of water an acoustic signal, comprising:
   explosively releasing within said body of water at a time t=o a first charge of a highly pressurized gas having an energy $E_a$ so as to produce in said water a primary pressure pulse and a very low pressure region tending to oscillate at a period T and to generate a secondary pressure pulse;
   injecting within said region a second charge of a pressurized gas having an energy $E_b$ such that $E_b$ is at least equal to $\frac{1}{2}$ ($E_a/k - 1$) where k equals the ratio of the specific heats of the injected gas; and,
   tuning the duration of said injection and the time when the injection starts so as to substantially establish hydrostatic pressure within said region at about the instant the volume of said region reaches a stationary value.

2. The method of claim 1 where said injection of said second charge starts between 0.05 T and 0.5 T.

3. The method of claim 1 where said duration of said injection has a maximum value substantially equal to about $(k - 1/3)$ $(E_b/E_a)$ times the period T.

4. A method for generating within a body of water an impulsive acoustic signal, comprising
   explosively releasing within said body of water at a time t=0, a first charge of a highly pressurized gas, having an energy $E_a$ so as to produce in said water a powerful primary pulse and a very low pressure region tending to oscillate at a period T and to generate secondary pulses;
   injecting within said region a second charge of a pressurized gas, said second charge having an energy $E_b$ sufficient to establish hydrostatic pressure within said region, where said injection of said second charge begins substantially between 0.05 T–0.5 T; and
   adjusting the ratio of the duration of said injection to the period T such that the duration of said injection has a maximum value substantially equal to the product of the period T and $(k-1)/3$ $(E_b/E_a)$, where k is the ratio of the specific heats of the injected gas.

5. The method of claim 4 where said first charge has a volume $V_a$ and a pressure $P_a$, said second charge has a volume $V_b$ and a pressure $P_b$, such that the ratio $P_b V_b / P_a V_a$ has a value greater than or equal about 2.0.

6. The method of claim 4, wherein said impulsive acoustic signal has a power spectrum flat substantially within 10dB over a frequency range of four octaves.

7. An acoustic source for generating within a body of water selected impulsive acoustic signals, comprising:
   means for explosively releasing within said body of water at a time t=0 a first charge of a pressurized gas having an energy Ea so as to produce in said water a selected primary pressure pulse and a low pressure region, said region tending to oscillate at a period T and to produce undesired secondary pressure pulses;
   means for injecting within said region a second charge of a pressurized gas, said second charge having an energy Eb sufficient to substantially establish hydrostatic pressure within the region;
   means for adjusting the duration of said injection such that said duration has a maximum value substantially equal to the product of the value $(k-1)/3$ $(E_b/E_a)$ and the period T, where k equals the ratio of the specific heats of the gas of the second charge; and means for adjusting the time the injection begins between a time 0.05 T and 0.5 T.

8. The acoustic source of claim 7 where prior to said injection, the volume of said region increases toward a maximum value $V_m$, the source further comprising means for tuning the time when said injection starts so that the quantity of energy that has been injected within said region when the volume of said region is equal to $V_m$ will be substantially equal to $\frac{1}{2} E_a/k-1$, where k equals the ratio of specific heats of the gas of the second charge.

9. The acoustic source of claim 7 further comprising means for periodically repeating said explosive release of said pressurized gas and said injection of said pressurized gas.

10. The acoustic source of claim 7 wherein said first charge has a volume $V_a$ and pressure $P_a$, said second charge has a volume $V_b$ and a pressure $P_b$ and the ratio $P_bV_b/P_aV_a$ has a value greater than or equal about 2.5.

11. A repetitive marine acoustic source for generating within a body water impulsive acoustic signals, comprising:
- a signal chamber having discharge port means into the water, said signal chamber containing a first charge of a pressurized gas having an energy Ea;
- a first fast-acting valve means normally maintaining said signal chamber closed;
- an injection chamber having outlet means, said injection chamber capable of containing a second charge of a pressurized gas having an energy Eb;
- a second fast-acting valve means normally maintaining said injection chamber closed;
- control means for opening said first fast-acting valve means at a time t=0, so as to explosively discharge said first charge through said signal chamber's port means into said water, thereby generating within said water a primary pressure pulse and a low pressure region, said low pressure region tending to oscillate at a period T and to produce in said water secondary pressure pulses;
- said control means opening said second fast-acting valve means, thereby releasing said second charge through said injection chamber's outlet means into said region;
- means for adjusting the duration of said injection such that said duration has a maximum value substantially equal to the product of the value $(k-1)/3$ $E_b/E_a$ and the period T, where k equals ratio of the specific heats of the gas of the second charge, $E_a$ equals the energy of the first charge, and $E_b$ equals the energy of the second charge; and
- means for controlling the time the injection begins between substantially 0.05 T and 0.5 T.

12. The marine acoustic source of claim 11 further including means for periodically repeating said explosive discharge and said injection.

13. The marine source according to claim 11, wherein said outlet means communicates directly with said water.

14. The marine source of claim 11, wherein said outlet means are encompassed by said region.

15. The acoustic source according to claim 11, wherein said control means include pneumatic delay means.

16. The marine source according to claim 11, wherein said control means include electrical delay means.

17. A method for generating within a body of water an impulsive acoustic signal having a primary pressure pulse with an amplitude $P_o$, and tending to have secondary pressure pulses with amplitudes $P_2$, comprising:
- explosively releasing within said body of water a first charge of a highly pressurized gas at a time t=0, where said gas has a volume $V_a$ and a pressure $P_a$ so as to produce a powerful primary pulse and a cavity, said cavity tending to oscillate at a period T;
- injecting a second charge of highly pressurized gas having a volume $V_b$ and a pressure $P_b$ within said region at a time before the cavity begins to implode such that the product $P_bV_b$ has a minimum value at least equal to $\frac{1}{2} (P_aV_a/k-1)$; and
- adjusting the pressure $P_b$ of the second charge so that the ratio of the secondary pulse $P_2$ to the primary pulse $P_o$ achieves a range of 0–15%.

18. A method for generating within a body of water an impulsive acoustic signal having a primary pressure pulse with an amplitude $P_o$ and tending to form secondary pressure pulses with amplitudes $P_2$, comprising:
- explosively releasing within said body of water a charge of a pressurized gas at a time t=0, where said gas has an energy Ea, so as to produce a powerful primary pulse with an amplitude $P_o$, and a cavity, said cavity tending to oscillate at a period T;
- injecting a second charge of a pressurized gas having an energy $E_b$ within said region beginning at a time $t_1$;
- controlling the duration of said injection to have a maximum value substantially equal to about $(k-1/3)$ $(E_b/E_a)$ times the period T, where k equals the ratio of the specific heats of the injected gas; and
- adjusting the time $t_1$ and duration of said injection such that the $P_2/P_o$ ratio maintains a selected range.

19. The method of claim 18 wherein the selected range is defined as being between 0–15%.

20. A method for generating within a body of water an impulsive acoustic signal having a primary pressure pulse with an amplitude $P_o$ and tending to form secondary pressure pulses, with amplitudes $P_2$, comprising:
- explosively releasing within said body of water a first charge of a highly pressurized gas at a time t=0, where said gas has an energy Ea, so as to produce a powerful primary pressure pulse $P_o$ and a cavity, where said cavity tends to oscillate about a period T;
- injecting a second charge of pressurized gas having an energy $E_b$ within said region beginning at a time $t_1$ substantially between 0.05 T and 0.5 T; and
- adjusting the duration of said injection such that the ratio of the amplitudes of the secondary pulse to the ratio of the primary pulse maintains a range of 0–15%.

21. A method of marine seismic exploration, comprising:
(a) explosively releasing within a body of water at a time t=0 a first charge of a pressurized gas having a pressure $P_a$ and a volume $V_a$, so as to produce in said water a powerful primary pressure pulse and a low pressure region tending to oscillate at a period T, said oscillations generating in said body of water a series of secondary pressure pulses;
(b) injecting within said region a second charge of a highly pressurized gas having a volume $V_b$ and a pressure $P_b$, said injection of said second charge beginning substantially between 0.05 T and 0.5 T;

(c) controlling the duration of said injection to have a maximum value substantially equal to about $(k-1/3)$ $(E_b/E_a)$ times the period T, where k equals the ratio of the specific heats of the gas of the second charge; and (d) adjusting the pressure $P_b$ of said injection so that the ratio of the amplitude of the secondary pulse to the amplitude of the primary pulse achieves a range of 0–15%.

22. An explosive-type, substantially bubble-free acoustic apparatus for use in a body of water, said apparatus comprising:

a signal generator;

a bubble suppressor;

said generator and said suppressor each having a chamber for receiving a charge of highly pressurized gas, a discharge port into the water, a movable shuttle valve for controlling said discharge port, and a solenoid-operated valve for controlling the actuation of said shuttle valve;

each shuttle valve having a main piston for closing and opening the discharge port and for allowing the chamber to communicate directly with the outside medium, a control piston for controlling the movements of said main pistons, and a hollow shaft having an axial bore for maintaining said pistons in spaced relation;

said generator's chamber periodically receiving, in use, a first charge of highly pressurized gas, and said suppressor's chamber, in use, periodically receiving a second charge of highly pressurized gas;

said generator's shuttle valve being adapted to explosively release, at a time t=0, pressurized gas $(k-1$ $E_b/3$ $E_a)$ times the period T, where k equals the ratio of the specific heats of the injected gas.

23. The acoustic apparatus of claim 22 further including means to tune the duration of the gas release from the bubble suppressor.

24. The acoustic apparatus of claim 23 wherein the means to tune the duration of the gas release includes at least one adjustable orifice.

25. The acoustic apparatus according to claim 22, wherein said bubble suppressor's discharge port is encompassed by said bubble.

26. The acoustic apparatus of claim 22, wherein said signal generator and said bubble suppressor are arranged such that the major axis of both the generator and the suppressor are in substantial coaxial alignment with each other.

27. The apparatus according to claim 22 wherein a deflector is coupled to said suppressor for deflecting the gas released from said suppressor's chamber and through said suppressor's discharge port into said bubble.

28. The apparatus of claim 26, wherein said bubble has four lobes; and said deflector has a chamber with four outlets for deflecting the gas released from said suppressor's discharge ports, and for directing the deflected gas toward respective lobes.

29. The apparatus according to claim 22, further comprising:

a casing defining therein said signal generator's chamber and said suppressor's chamber.

30. The apparatus according to claim 26, and a casing defining therein said signal generator's chamber and said suppressor's chamber.

31. A method for generating within a body of water an acoustic signal, comprising:

releasing within said body of water at a time t=0 a first charge of a highly pressurized gas having an energy $E_a$ so as to produce in said water a powerful primary pressure pulse and a very low pressure region tending to reach a maximum volume $V_m$ and to oscillate at a period T and to generate secondary pressure pulses;

injecting within said region a second charge of a pressurized gas having an energy $E_b$ at least equal to $(\frac{1}{2} E_a/k-1)$, where k equal to the ratio of the specific heats of the injected gas where said injection increases the internal pressure of the low pressure region up to a maximum value substantially equal to the surrounding hydrostatic pressure, where said hydrostatic pressure is reached when the work performed by the injected gas is substantially equal to the work done by the hydrostatic pressure beyond the maximum volume $V_m$.

32. A method of suppressing secondary pulses in the generation of a seismic signal by injecting a charge of gas into a body of water, comprising:

injecting a first charge of a gas at a pressure $P_a$ and a volume $V_a$ into a body of water at a depth and in a quantity sufficient to form a first bubble resulting in a seismic signal which will tend to begin to form at least one secondary signal at a time T following such injection;

injecting a second charge of gas into the bubble beginning at a time between 0.05 T and 0.5 T said charge of gas having a pressure $P_b$ and a value $V_b$ such that the pressure in the bubble formed by injecting the first and second charges equals the hydrostatic pressure when the bubble volume becomes stationary; and adjusting the duration of said injection to have a maximum value substantially equal to about $(k-1$ $P_b V_b/3$ $P_a V_b)$ times the period T, where k equals the ratio of the specific heats of the injected gas.

33. A method of suppressing secondary pulses in the generation of a seismic signal by injecting a charge of gas in a body of water, comprising:

injecting a first charge of gas having a first energy $E_a$ into a body of water at a depth and in a quantity sufficient to form a first bubble expanding toward a maximum volume $V_m$ and resulting in a seismic signal which will tend to form at least one secondary pulse;

injecting a second charge of gas having an energy $E_b$ into the bubble at a beginning time substantially between 0.05 T and 0.5 T and at a rate such that the energy injected into the bubble at the time when the bubble establishes its volume $V_m$, is approximately equal to 1.25 times the energy injected in the first charge; and means for injecting within said region a second charge of a pressurized gas, said second charge having an energy Eb sufficient to substantially establish hydrostatic pressure within the region; and means for adjusting the duration of said injection such that said duration has a maximum value substantially equal to the product of the value $(k-1)/3$ $(E_b/E_a)$ and the period T, where k equals the ratio of the specific heats of the gas of the second charge.

* * * * *